(12) United States Patent
Abreu

(10) Patent No.: US 12,192,196 B1
(45) Date of Patent: Jan. 7, 2025

(54) SYSTEM AND APPARATUS FOR BIOMETRIC IDENTIFICATION OF A UNIQUE USER AND AUTHORIZATION OF THE UNIQUE USER

(71) Applicant: Brain Tunnelgenix Technologies Corp., Aventura, FL (US)

(72) Inventor: Marcio Marc Abreu, Aventura, FL (US)

(73) Assignee: Brain Tunnelgenix Technologies Corp., Aventura, FL (US)

( * ) Notice: Subject to any disclaimer, the term of this patent is extended or adjusted under 35 U.S.C. 154(b) by 0 days.

(21) Appl. No.: 17/091,937

(22) Filed: Nov. 6, 2020

Related U.S. Application Data

(63) Continuation of application No. 16/543,882, filed on Aug. 19, 2019, now Pat. No. 11,689,525, which is a continuation of application No. 15/061,036, filed on Mar. 4, 2016, now Pat. No. 10,389,711.

(60) Provisional application No. 62/131,032, filed on Mar. 10, 2015.

(51) Int. Cl.
| | |
|---|---|
| *H04L 9/40* | (2022.01) |
| *G06Q 20/40* | (2012.01) |
| *G07C 9/37* | (2020.01) |
| *G07F 19/00* | (2006.01) |
| *G08B 5/36* | (2006.01) |

(Continued)

(52) U.S. Cl.
CPC ... *H04L 63/0861* (2013.01); *G06Q 20/40145* (2013.01); *G07C 9/37* (2020.01); *G07F 19/207* (2013.01); *H04L 63/083* (2013.01); *G08B 5/36* (2013.01); *G08B 15/00* (2013.01); *G08B 25/016* (2013.01)

(58) Field of Classification Search
CPC .. G06Q 20/40145; G07C 9/37; G07F 19/207; G08B 15/00; G08B 25/016; G08B 5/36; H04L 63/083; H04L 63/0861
See application file for complete search history.

(56) References Cited

U.S. PATENT DOCUMENTS

| | | | | |
|---|---|---|---|---|
| 5,623,552 A | * | 4/1997 | Lane | G06K 13/073 |
| | | | | 340/5.83 |
| 5,805,719 A | * | 9/1998 | Pare, Jr. | G07C 9/37 |
| | | | | 382/224 |

(Continued)

FOREIGN PATENT DOCUMENTS

| | | |
|---|---|---|
| WO | 2002003432 A1 | 1/2002 |
| WO | 20060012570 A1 | 2/2006 |
| WO | 2011/094213 A1 | 8/2011 |

OTHER PUBLICATIONS

Search Query Report from IP.com (performed Mar. 1, 2023) (Year: 2023).*

(Continued)

*Primary Examiner* — Sharon S Lynch
(74) *Attorney, Agent, or Firm* — Studebaker & Brackett PC

(57) ABSTRACT

A verification device provides an approach to identification and authorization by requiring an authorized presence before permitting the input of a sequence of signals. Furthermore, the device may be configured to recognize incorrect inputs, and to respond by transmitting an alert code while providing limited functionality to convince an authorized user that access has been granted until a location of the device has been determined.

16 Claims, 23 Drawing Sheets

(51) Int. Cl.
*G08B 15/00* (2006.01)
*G08B 25/01* (2006.01)

(56) References Cited

U.S. PATENT DOCUMENTS

| | | | | |
|---|---|---|---|---|
| 5,818,956 A * | 10/1998 | Tuli | | G06V 40/1324 |
| | | | | 340/5.83 |
| 5,920,642 A | 7/1999 | Merjanian | | |
| 5,926,261 A * | 7/1999 | Hoshino | | G06V 40/145 |
| | | | | 356/71 |
| 6,131,464 A * | 10/2000 | Pare, Jr. | | G06V 40/13 |
| | | | | 73/714 |
| 6,229,906 B1 * | 5/2001 | Pu | | G07C 9/37 |
| | | | | 382/116 |
| 6,323,846 B1 * | 11/2001 | Westerman | | G06F 3/0235 |
| | | | | 345/173 |
| 6,373,967 B2 * | 4/2002 | Pu | | G07C 9/37 |
| | | | | 340/5.82 |
| 6,400,996 B1 * | 6/2002 | Hoffberg | | G06F 18/00 |
| | | | | 700/86 |
| 6,509,847 B1 * | 1/2003 | Anderson | | G06F 3/04883 |
| | | | | 178/18.01 |
| 6,539,101 B1 * | 3/2003 | Black | | G07F 7/10 |
| | | | | 713/186 |
| 6,766,456 B1 * | 7/2004 | McKeeth | | G06F 21/36 |
| | | | | 713/168 |
| 6,937,748 B1 * | 8/2005 | Schneider | | G06V 40/13 |
| | | | | 382/126 |
| 6,970,582 B2 * | 11/2005 | Langley | | G06V 10/811 |
| | | | | 382/218 |
| 6,970,584 B2 * | 11/2005 | O'Gorman | | G06V 40/1335 |
| | | | | 340/5.83 |
| 6,980,672 B2 | 12/2005 | Saito et al. | | |
| 7,152,045 B2 * | 12/2006 | Hoffman | | G07F 7/025 |
| | | | | 235/382 |
| 7,689,013 B2 * | 3/2010 | Shinzaki | | G06V 40/1394 |
| | | | | 340/5.82 |
| 7,877,612 B2 * | 1/2011 | McKeeth | | G06F 21/40 |
| | | | | 713/186 |
| 7,929,736 B2 * | 4/2011 | Bechtel | | G06F 3/03545 |
| | | | | 340/5.83 |
| 8,176,547 B2 * | 5/2012 | McKeeth | | G06F 21/31 |
| | | | | 726/19 |
| 8,352,745 B2 * | 1/2013 | McKeeth | | G06V 40/12 |
| | | | | 713/183 |
| 8,694,793 B2 * | 4/2014 | Evans | | G07F 7/1008 |
| | | | | 726/20 |
| 8,789,206 B2 * | 7/2014 | Harris | | G06F 21/36 |
| | | | | 726/28 |
| 8,836,473 B2 * | 9/2014 | Wadia | | G06Q 20/4012 |
| | | | | 340/5.53 |
| 8,839,416 B2 * | 9/2014 | McKeeth | | G06F 21/6218 |
| | | | | 726/19 |
| 8,873,814 B2 * | 10/2014 | Goel | | G06V 40/28 |
| | | | | 382/125 |
| 8,907,897 B2 * | 12/2014 | Ferren | | H03K 17/962 |
| | | | | 345/173 |
| 9,021,270 B1 * | 4/2015 | Byers | | H04M 1/673 |
| | | | | 713/186 |
| 9,372,123 B2 | 6/2016 | Li | | A61B 5/0004 |
| 9,465,929 B2 * | 10/2016 | McKeeth | | G06F 21/6218 |
| 9,542,685 B2 | 1/2017 | Proud | | A61B 5/0008 |
| 9,576,157 B2 | 2/2017 | Fitzgerald | | H04M 1/724631 |
| 9,678,591 B2 | 6/2017 | Nikoozadeh | | G06F 3/0447 |
| 9,811,651 B2 * | 11/2017 | McKeeth | | G06F 3/041 |
| 9,830,493 B2 | 11/2017 | Bechtel | | G06V 40/1371 |
| 9,910,974 B2 | 3/2018 | McKeeth | | G06F 3/0488 |
| 10,311,221 B2 * | 6/2019 | McKeeth | | G06F 21/36 |
| 10,331,869 B2 * | 6/2019 | McKeeth | | G06F 21/40 |
| 10,534,900 B2 * | 1/2020 | Cheong | | A61B 5/0022 |
| 2002/0034321 A1 * | 3/2002 | Saito | | G06V 40/12 |
| | | | | 382/124 |
| 2002/0106115 A1 * | 8/2002 | Rajbenbach | | G06V 40/13 |
| | | | | 382/126 |
| 2003/0105725 A1 * | 6/2003 | Hoffman | | G06Q 20/40 |
| | | | | 705/50 |
| 2004/0046574 A1 * | 3/2004 | Chou | | G01L 1/146 |
| | | | | 324/658 |
| 2004/0076314 A1 * | 4/2004 | Cheng | | G06V 40/13 |
| | | | | 382/126 |
| 2004/0101171 A1 * | 5/2004 | Lane | | G06V 40/13 |
| | | | | 382/124 |
| 2004/0101172 A1 * | 5/2004 | Lane | | G06V 40/13 |
| | | | | 382/124 |
| 2004/0170307 A1 * | 9/2004 | Manansala | | G06V 40/1335 |
| | | | | 382/126 |
| 2005/0015630 A1 | 1/2005 | Yumoto et al. | | |
| 2005/0021960 A1 * | 1/2005 | McKeeth | | G06F 3/041 |
| | | | | 713/170 |
| 2005/0022005 A1 * | 1/2005 | McKeeth | | G06F 21/6218 |
| | | | | 726/26 |
| 2005/0044382 A1 * | 2/2005 | McKeeth | | G06F 21/40 |
| | | | | 713/182 |
| 2005/0125679 A1 * | 6/2005 | Bell | | G06F 21/32 |
| | | | | 713/186 |
| 2005/0263836 A1 * | 12/2005 | Okada | | H01L 24/32 |
| | | | | 257/415 |
| 2006/0012570 A1 * | 1/2006 | Yumoto | | G06F 3/03547 |
| | | | | 345/157 |
| 2006/0093192 A1 * | 5/2006 | Bechtel | | G06V 40/13 |
| | | | | 382/126 |
| 2007/0071291 A1 | 3/2007 | Yumoto et al. | | |
| 2007/0076924 A1 * | 4/2007 | Fujii | | G06V 40/13 |
| | | | | 382/124 |
| 2007/0139395 A1 * | 6/2007 | Westerman | | G06F 3/0446 |
| | | | | 345/173 |
| 2007/0147667 A1 | 6/2007 | Sumita et al. | | |
| 2007/0198850 A1 * | 8/2007 | Martin | | G07C 9/257 |
| | | | | 713/186 |
| 2007/0229477 A1 | 10/2007 | Ludwig | | |
| 2007/0268273 A1 * | 11/2007 | Westerman | | G06V 40/107 |
| | | | | 345/173 |
| 2008/0062144 A1 * | 3/2008 | Shahoian | | G06F 3/03547 |
| | | | | 345/173 |
| 2008/0069412 A1 * | 3/2008 | Champagne | | G06V 40/13 |
| | | | | 382/124 |
| 2008/0122577 A1 * | 5/2008 | Gutta | | G06F 21/32 |
| | | | | 340/5.52 |
| 2009/0150994 A1 * | 6/2009 | Evans | | G07F 7/1008 |
| | | | | 726/20 |
| 2009/0153297 A1 * | 6/2009 | Gardner | | G06K 19/07732 |
| | | | | 340/5.83 |
| 2009/0231275 A1 * | 9/2009 | Odgers | | G06F 3/04886 |
| | | | | 345/157 |
| 2009/0232367 A1 * | 9/2009 | Shinzaki | | G06V 40/1394 |
| | | | | 382/124 |
| 2009/0253410 A1 * | 10/2009 | Fitzgerald | | H04M 1/724631 |
| | | | | 455/414.1 |
| 2010/0044121 A1 * | 2/2010 | Simon | | G06F 3/04883 |
| | | | | 178/18.03 |
| 2010/0315337 A1 * | 12/2010 | Ferren | | H03K 17/962 |
| | | | | 345/158 |
| 2011/0119759 A1 * | 5/2011 | McKeeth | | G06F 21/36 |
| | | | | 726/19 |
| 2011/0285648 A1 * | 11/2011 | Simon | | G06F 3/041 |
| | | | | 345/173 |
| 2011/0298711 A1 | 12/2011 | Dean et al. | | |
| 2012/0127179 A1 * | 5/2012 | Aspelin | | G06F 21/32 |
| | | | | 345/173 |
| 2012/0198544 A1 * | 8/2012 | McKeeth | | G06F 21/6218 |
| | | | | 726/17 |
| 2013/0129161 A1 * | 5/2013 | Goel | | G06V 40/28 |
| | | | | 382/124 |
| 2013/0185790 A1 * | 7/2013 | McKeeth | | G06F 21/32 |
| | | | | 726/19 |
| 2013/0321337 A1 * | 12/2013 | Graham | | G06F 3/041 |
| | | | | 345/174 |

(56) References Cited

U.S. PATENT DOCUMENTS

| | | | | |
|---|---|---|---|---|
| 2014/0086460 A1* | 3/2014 | Bechtel | ............ | G06V 40/1353 382/126 |
| 2014/0104180 A1* | 4/2014 | Schaffer | ............... | G06F 3/0236 345/169 |
| 2014/0168117 A1* | 6/2014 | Kim | ................... | H04M 1/6505 345/173 |
| 2014/0270414 A1* | 9/2014 | Slaby | .................... | G06V 40/13 382/124 |
| 2014/0351928 A1* | 11/2014 | McKeeth | ........... | G06F 21/6218 726/19 |
| 2014/0362013 A1* | 12/2014 | Nikoozadeh | .......... | G06K 19/07 345/173 |
| 2014/0380465 A1* | 12/2014 | Fadell | ................ | H04W 12/065 726/19 |
| 2015/0035680 A1* | 2/2015 | Li | ....................... | A61B 5/7246 340/584 |
| 2015/0078586 A1* | 3/2015 | Ang | ........................ | H03G 3/04 381/109 |
| 2015/0091859 A1* | 4/2015 | Rosenberg | ........... | G06F 3/0446 345/174 |
| 2015/0103018 A1* | 4/2015 | Kamin-Lyndgaard | ...................... | G06F 3/0443 345/173 |
| 2015/0103021 A1* | 4/2015 | Lim | .................... | G02B 27/017 345/173 |
| 2015/0235098 A1* | 8/2015 | Lee | ................... | G06V 40/1365 715/709 |
| 2016/0063230 A1* | 3/2016 | Alten | ..................... | G06F 21/32 726/28 |
| 2016/0078268 A1* | 3/2016 | Mankowski | ........... | G06V 40/40 382/124 |
| 2016/0140379 A1* | 5/2016 | Pedersen | ................ | G06V 40/63 726/19 |
| 2016/0188947 A1* | 6/2016 | Bechtel | ............. | G06V 40/1306 382/124 |
| 2016/0335632 A1* | 11/2016 | Proud | .................. | G06Q 20/321 |
| 2017/0011210 A1* | 1/2017 | Cheong | .................. | A61B 5/681 |
| 2017/0124310 A1* | 5/2017 | McKeeth | ................ | G06F 21/36 |
| 2017/0140142 A1* | 5/2017 | McKeeth | ............... | G06V 40/12 |
| 2018/0144178 A1* | 5/2018 | Han | ..................... | H04L 63/0815 |
| 2018/0150625 A1* | 5/2018 | McKeeth | ............... | G06V 40/12 |
| 2018/0165440 A1* | 6/2018 | McKeeth | ............... | G06F 3/0488 |
| 2018/0173928 A1* | 6/2018 | Han | ..................... | H04L 63/083 |
| 2018/0173929 A1* | 6/2018 | Han | ..................... | H04W 12/06 |
| 2019/0220647 A1* | 7/2019 | Han | ........................ | G06F 21/41 |

OTHER PUBLICATIONS

International Search Report and Written Opinion of the International Searching Authority dated Jul. 11, 2016, issued in International Application No. PCT/US2016/020877.

International Preliminary Report on Patentability dated Sep. 21, 2017, issued in International Application No. PCT/US2016/020877; 7pp.

Search Query Report from IP.com (performed Sep. 9, 2021) (Year: 2021).

Search Query Report from IP.com (performed Apr. 22, 2022) (Year: 2022).

Search Query Report from IP.com (performed Aug. 26, 2022) (Year: 2022).

Search Query Report from IP.com (performed Feb. 1, 2023) (Year: 2023).

* cited by examiner

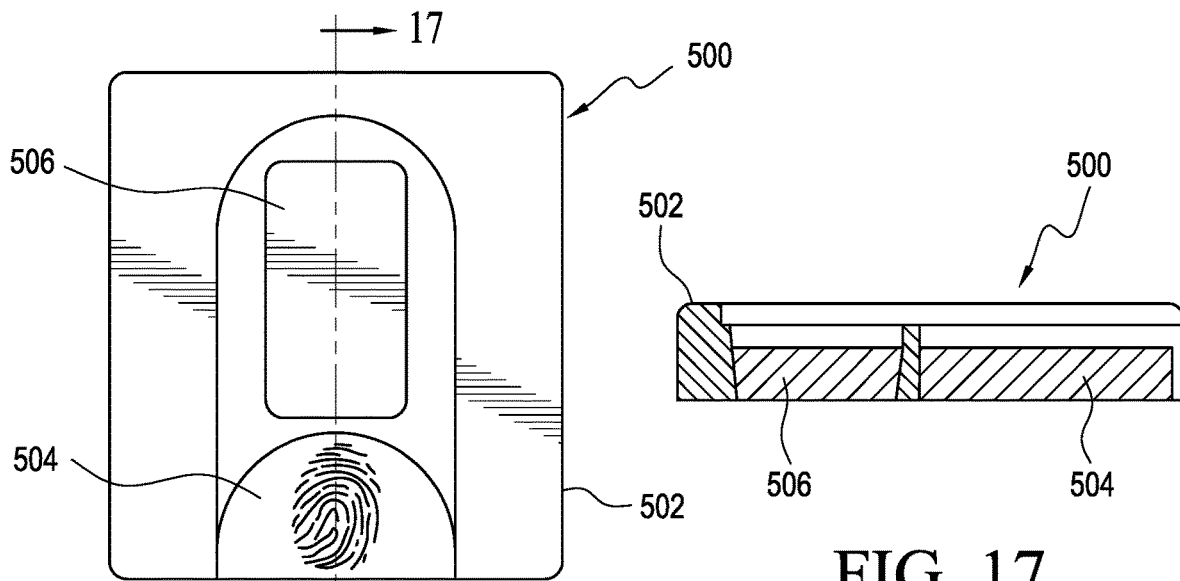
FIG. 16
FIG. 17
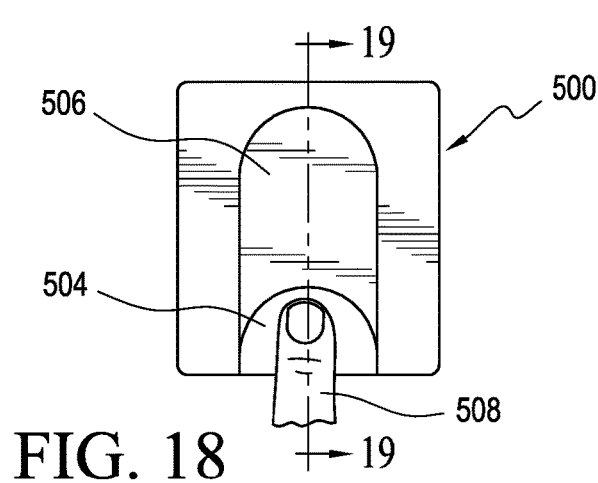
FIG. 18
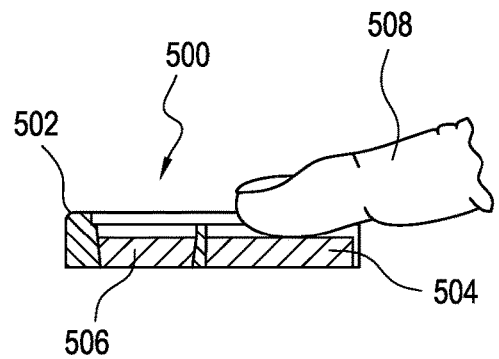
FIG. 19
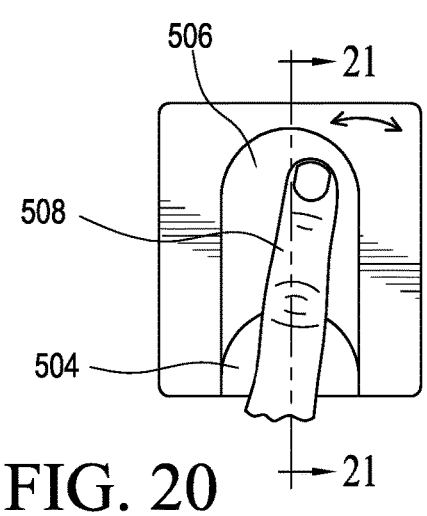
FIG. 20
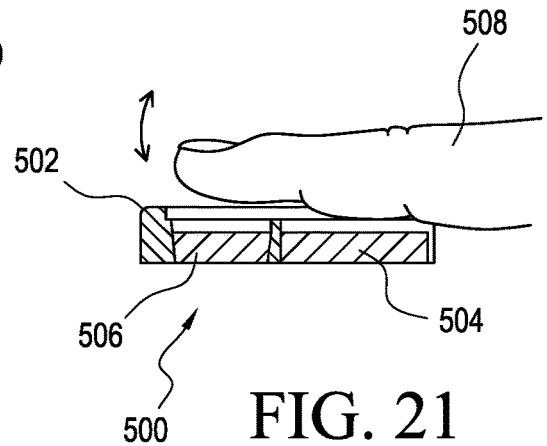
FIG. 21

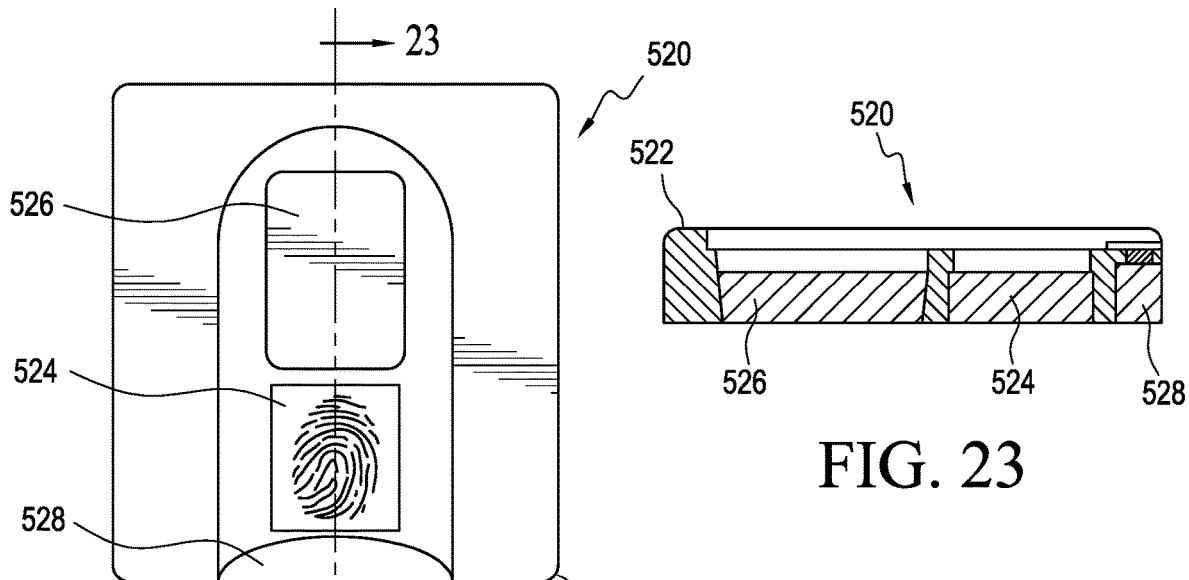
FIG. 22
FIG. 23
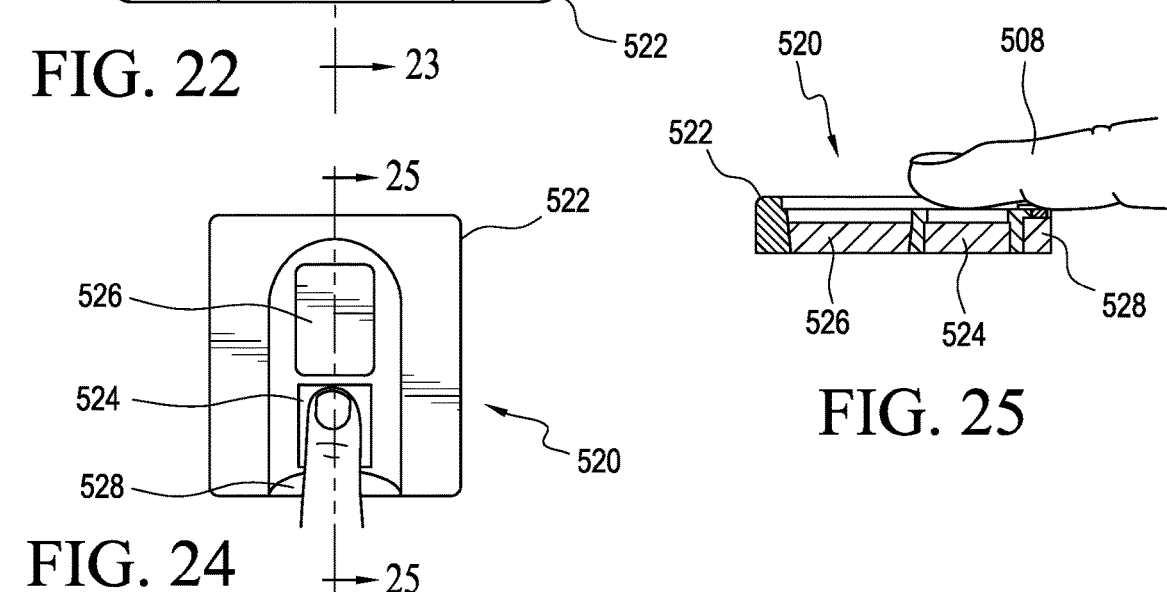
FIG. 24
FIG. 25
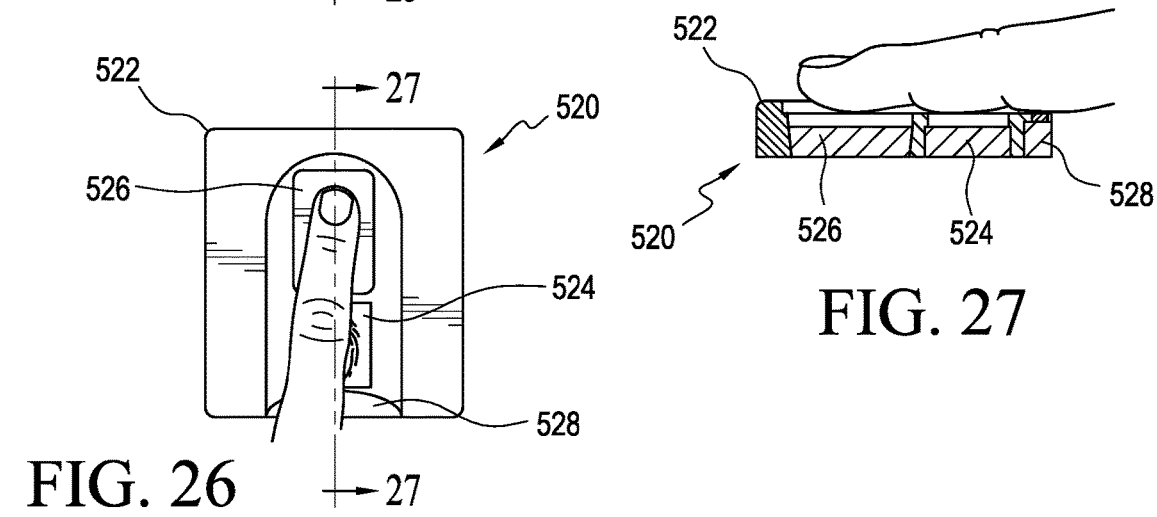
FIG. 26
FIG. 27

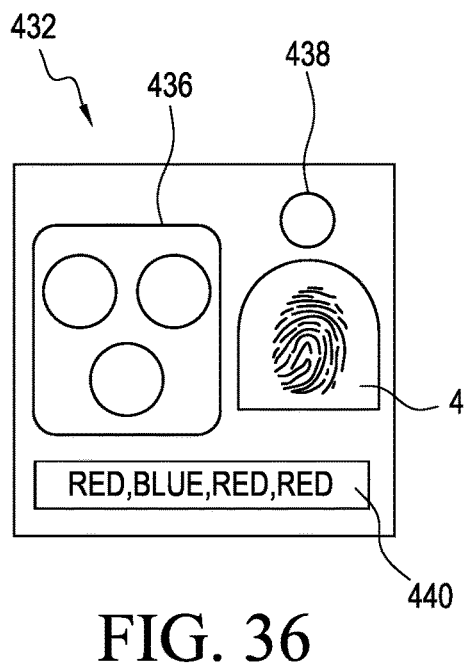
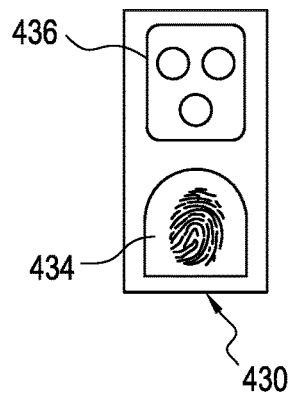
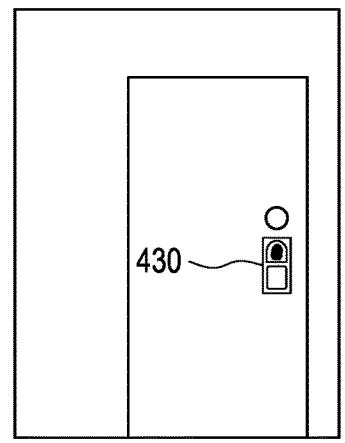
FIG. 36   FIG. 38   FIG. 37
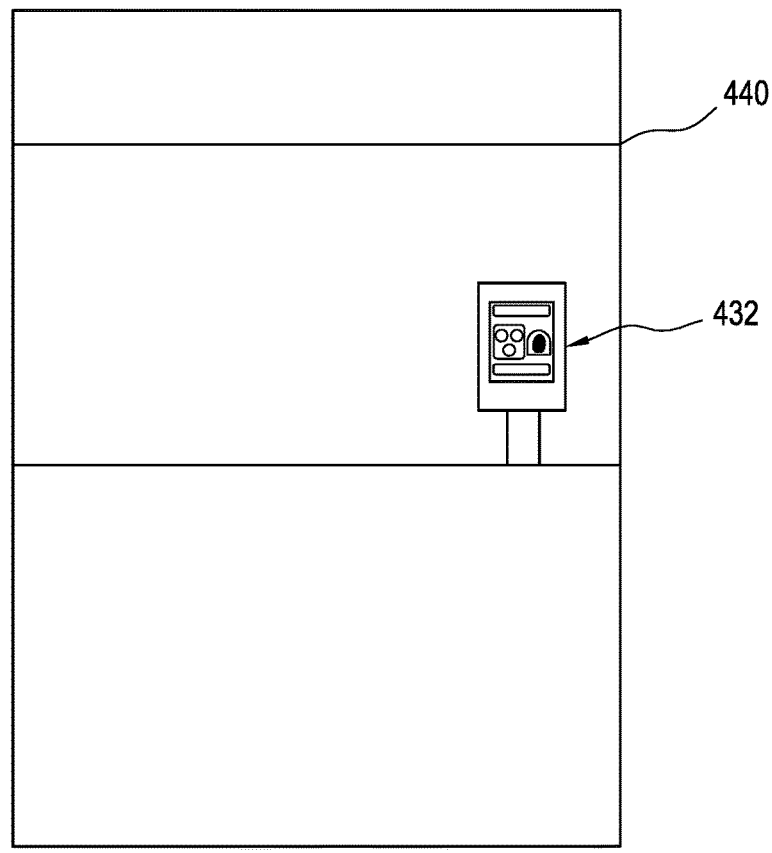
FIG. 35

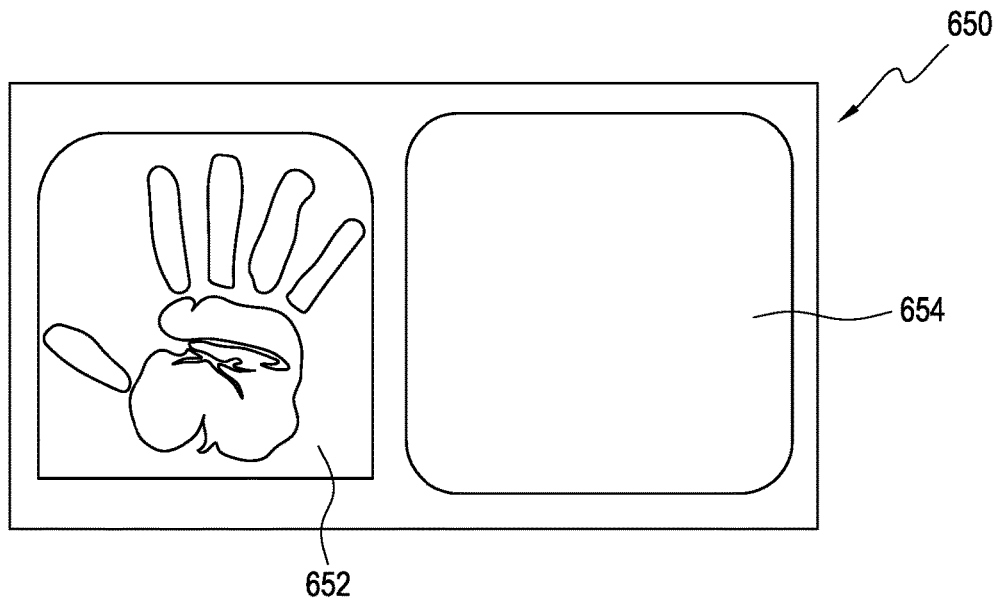
FIG. 43
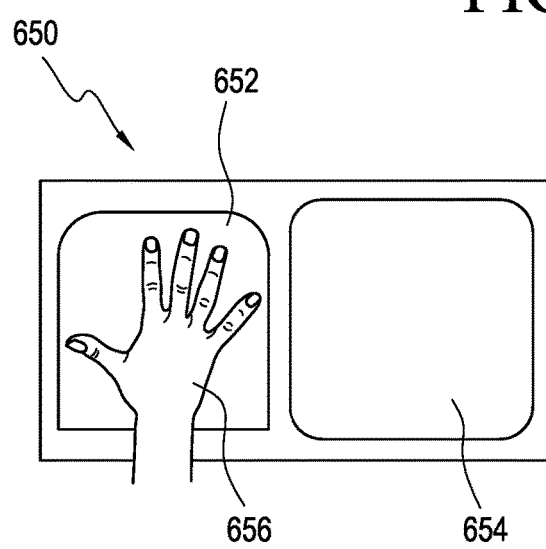 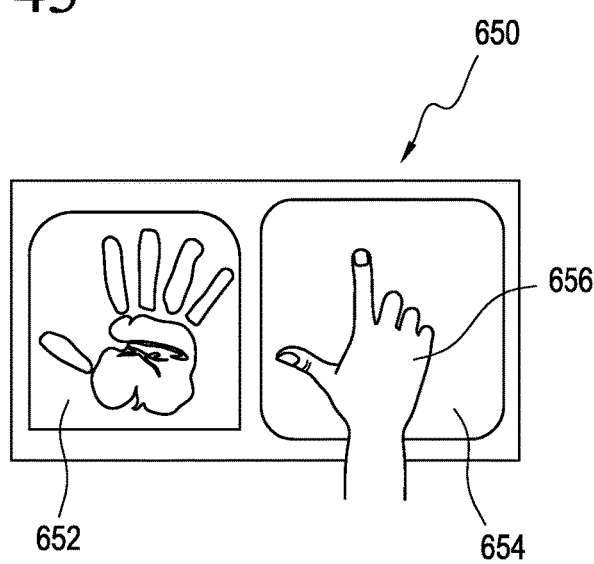
FIG. 44          FIG. 45

SYSTEM AND APPARATUS FOR BIOMETRIC IDENTIFICATION OF A UNIQUE USER AND AUTHORIZATION OF THE UNIQUE USER

CROSS-REFERENCE TO RELATED APPLICATIONS

This application is a Continuation of U.S. patent application Ser. No. 16/543,882, filed on Aug. 19, 2019, which is a Continuation of U.S. patent application Ser. No. 15/061,036, filed on Mar. 4, 2016, which in turn claims priority to U.S. Provisional Patent Application No. 62/131,032, filed on Mar. 10, 2015, all of which are incorporated by reference herein their entirety.

TECHNICAL FIELD

This disclosure relates to systems and devices configured w identify the identity of a user uniquely using a biometric input from the user and to then authorize the user to access a device, apparatus, or system.

BACKGROUND

Devices exist that authorize a user to gain access to a building, a location, a device, an apparatus, etc., ranging from combination locks, key codes, passwords, etc. More recently, biometric inputs have been used to identify the identity of an authorized person, including fingerprints and eye scans.

SUMMARY

The present disclosure provides a verification device comprising at least one fingerprint sensor pad and a plurality of pressure sensitive sensors. At last one first pressure sensitive sensor is positioned on a first side of the at least one fingerprint sensor pad, and at least one second pressure sensitive sensor is positioned on a second side of the at least one fingerprint sensor pad from the at least one first pressure sensitive sensor. The at least one first pressure sensitive sensor and the at least one second pressure sensitive sensor are positioned such that a finger positioned in contact with the at least one fingerprint sensor pad actuates only the at least one first pressure sensitive pad or only the at least one second pressure sensitive pad by a rolling motion in the direction of the at least one first pressure sensitive pad or in the direction of the at least one second pressure sensitive pad.

This disclosure also provides a system comprising a verification device and a processor. The verification device includes at least one fingerprint sensor pad and at least one sensor. The verification device is configured to identify a user from fingerprint data received by the at least one fingerprint sensor pad and to actuate the at least one sensor based on the identification. The at least one sensor is positioned to identify movement of a finger. The verification device is further configured to transmit signals that include the fingerprint data and signals from the at least one sensor. The processor is configured to receive the fingerprint data, to provide the user identification based on the fingerprint data to determine whether signals from the at least one sensor authorize a user access to the system, and to enable such access upon determining that the signals correspond to an authorized access code.

This disclosure also provides a biometric authentication system, comprising a processor, a biometric input apparatus, and an input code device. The biometric input apparatus is configured to accept a biometric input from a user and to transmit the biometric input to the processor. The processor is configured to determine an identity of the user from the biometric input. The input code device is configured to accept a code from the identified user, and to provide at least one function based on the identification and the code.

Advantages and features of the embodiments of this disclosure will become more apparent from the following detailed description of exemplary embodiments when viewed in conjunction with the accompanying drawings.

BRIEF DESCRIPTION OF THE DRAWINGS

FIG. 16 shows a plan view of a verification device in accordance with an exemplary embodiment of the present disclosure.

FIG. 17 shows a sectional view of the verification device of FIG. 16 along the lines 17-17.

FIG. 18 shows a further view of the verification device of FIG. 16.

FIG. 19 shows a sectional view of the verification device of FIG. 18 along the lines 19-19.

FIG. 20 shows a yet further view of the verification device of FIG. 16.

FIG. 21 shows a sectional view of the verification device of FIG. 20 along the lines 21-21.

FIG. 22 shows a plan view of a verification device in accordance with an exemplary embodiment of the present disclosure.

FIG. 23 shows a sectional view of the verification device of FIG. 22 along the lines 23-23.

FIG. 24 shows a further view of the verification device of FIG. 22.

FIG. 25 shows a sectional view of the verification device of FIG. 24 along the lines 25-25.

FIG. 26 shows a yet further view of the verification device of FIG. 22.

FIG. 27 shows a sectional view of the verification device of FIG. 26 along the lines 26-26.

FIG. 35 shows a view of a system incorporating a verification device in accordance with an exemplary embodiment of the present disclosure.

FIG. 36 shows a view of the verification device of FIG. 35.

FIG. 37 shows a view of another system incorporating a verification device in accordance with an exemplary embodiment of the present disclosure.

FIG. 38 shows a view of the verification device of FIG. 37.

FIG. 43 shows a plan view of a verification device in accordance with an exemplary embodiment of the present disclosure.

FIG. 44 shows a view of the verification device of FIG. 43.

FIG. 45 shows a further view of the verification device of FIG. 43.

DETAILED DESCRIPTION

Figure 1:
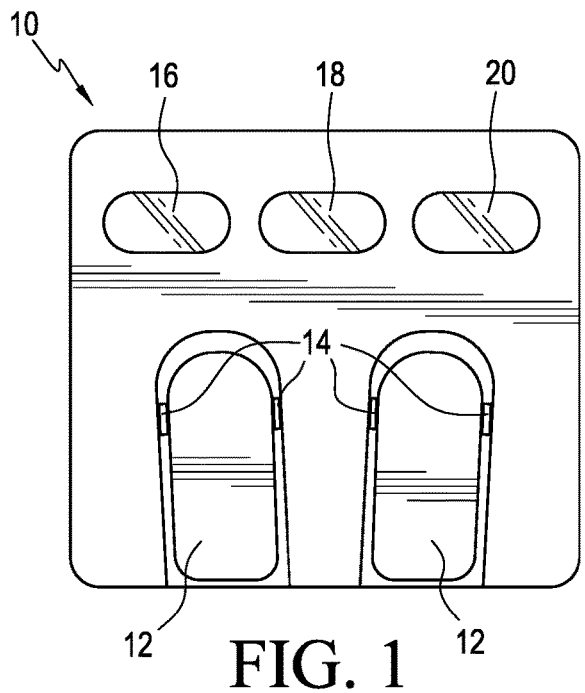
FIG. 1 shows a plan view of a verification device in accordance with an exemplary embodiment of the present disclosure.
Figure 2:
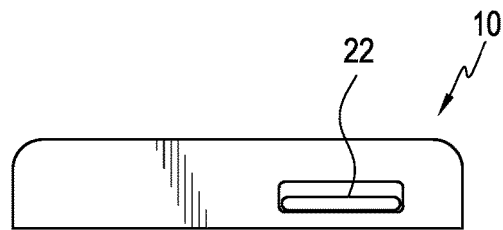
FIG. 2 shows a first end view of the verification device of FIG. 1.
Figure 3:
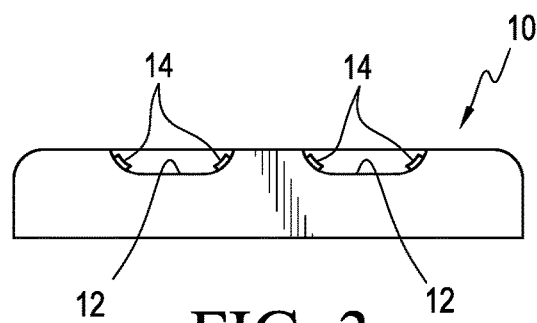
FIG. 3 shows a second end view of the verification device of FIG. 1.
Figure 4:
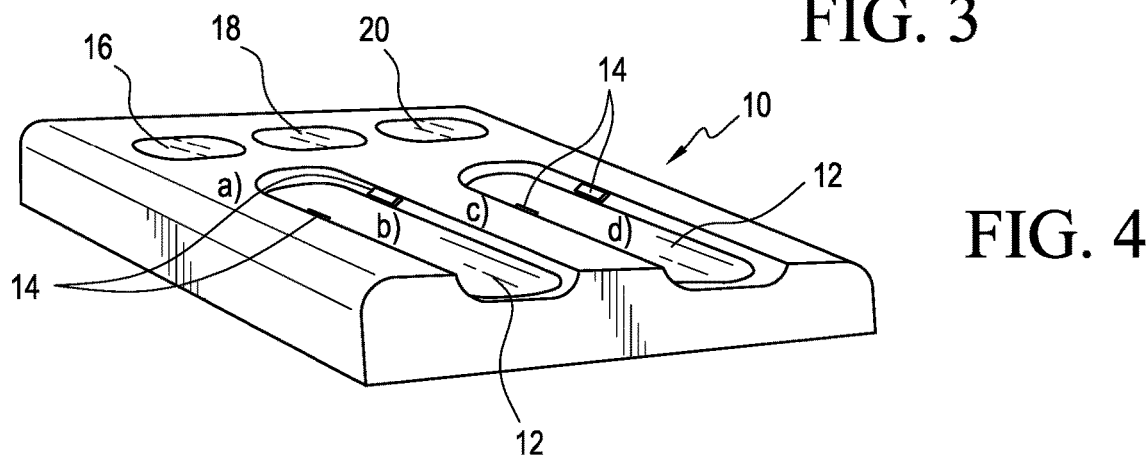
FIG. 4 shows a perspective view of the verification device of FIG. 1.

Various devices have been proposed to provide identification of an individual while authorizing their access to a document, a device, a location, a building, a financial transaction, a purchase, etc. Identification has been provided by fingerprints, voice prints, and eye scans, and authorization upon identification has been provided by, for example, passwords, combinations, etc. However, identification can sometimes be spoofed by, for example, transferring a fingerprint to an image or a simulacrum, and authorization can be hacked. The verification devices of the present disclosure provides an improved approach to identification and authorization, replacing conventional identification and authorization such as passwords, combinations, access to rooms, and access to buildings, including houses, etc., by requiring an authorized biometric presence while or prior to providing a sequence of signals. Because the verification devices disclosed herein require a combination of a unique biometric input, such as a fingerprint, retinal scan, hand print, etc., and an input from the brain of the user, the verification devices described herein can be described as biometric verification devices. Further, because the verification devices disclosed herein function to identify a unique user, and to then authenticate the identification, the verification devices disclosed herein can alternatively be described as authentication devices. In addition to identification and authentication, the disclosed devices may be configured to recognize incorrect inputs, and to respond by transmitting an alert code while providing limited functionality to convince an unauthorized user that access has been granted until a security entity, such as the police, FBI, military, security forces, etc., are able to respond to the alert code.

Applicant is a medical doctor who has treated many seriously harmed patients with injuries as serious as a skull cracked open as a result of robberies. Such robberies include an assailant who waits for a victim to receive money from an ATM machine. Thus, one of the objects of the present disclosure is to provide an identification verification system that helps to protect an authorized user against an assailant when the authorized user is withdrawing money from an ATM machine. Another object of the disclosure is to provide a system to reduce the need for carrying cash, and thus to become less of a target for robbery. The systems of the present disclosure include a limited functionality mode that will show a reduced amount of cash available to an authorized user. By showing a reduced amount of cash, the assailant will still take some amount of money, though less money than the assailant might otherwise have received without the disclosed limited functionality modes, and by receiving some money will be less likely to hurt the victim. Furthermore, the victim receives a measure of protection because of the reduced amount of cash or money taken by the assailant or robber. For example, once limited functionality is activated the authorized user account that actually had $10,000 available appears to have only $1,500 available (or any predetermined amount the authorized user decides should be displayed with entry of the proper inputs). As another example, the dispensing entity, such as a bank, credit union, savings and loan, or other financial institution, can automatically reduce available funds to 10% of total funds when limited functionality operation has been actuated by the authorized user.

The verification devices of the present disclosure are configured to provide identification of a body and a person. A biometric device (such as, by way of example, fingerprint, voice print, eye scanner, and the like) identify the body, but to identify the person or authorized user, i.e., that the brain of the identified body is present, a cognitive function must be performed, such as series of steps or codes known to that person or authorized user. A series of responses from the authorized user can be generated, and three exemplary outputs are: i) regular operation, in which the associated device or system performs the expected function(s), ii) alert operation, in which an output includes an alert, for example to the police, and iii) limited functionality, in which expected operation is performed but with limited or reduced functionality, which will become more apparent in view of the disclosure provided herein.

FIGS. 1-4 are views of a verification device in accordance with an exemplary embodiment of the present disclosure, indicated generally at 10. Device 10 is configured to include at least one fingerprint sensor pad 12, a plurality of pressure sensors 14, and one or more indicators. It should be understood that a variety of sensors can be used instead of pressure sensors or in conjunction with pressure sensors, such as optical sensors and LED's, motion sensors, vibration sensors, oxygen sensors, temperature sensors, sweat sensors, chemical sensors, and the like. Each one of said sensors are activated in a certain way by the authorized user to identify the authorized user (i.e., the brain of the authorized user). In an exemplary embodiment, the one or more indicators include a positive verification indicator 16, an unconfirmed verification indicator 18, and a negative verification indicator 20. It should be understood that other indicators may replace indicators 16, 18, and 20, such as audible indicators, tactile indicators, mechanical indicators, etc. Verification device 10 may also include a plug, connector, connection, or output 22 to permit connection of verification device IO to another device, such as a personal computer, tablet, cell phone, television, audio device, vehicle ignition, vehicle control system, etc., though such connection may also be through a wireless device (not shown).

Device IO operates by placing a finger in each available fingerprint sensor pad 12. It should be understood that device 10 may be configured to include more fingerprint sensor pads 12 than are shown. It should also be understood that in an alternative embodiment, not all fingerprint sensor pads 12 need to receive a finger. For example, device 10 could include three fingerprint sensor pads 12, but only require positive verification from two fingerprints. Once fingers (not shown) are placed in fingerprint sensor pads 12, device 12 gathers fingerprint data and compares the data to data stored in a non-transitory memory to determine the identity of the person to whom the fingerprints belong. If the fingerprints belong to an authorized person, device 10 may provide a brief indication by, for example, illuminating positive verification indicator 16 either briefly or with a first color, such as, for example, blue. The initial indication is a communication with a user that device IO is now ready to accept pressure sensor input via pressure sensors 14. It should be understood that device IO can further include one or more devices to determine that a user is alive, and may provide additional identification information. Such devices can include, for example, a pulsimeter, an oxygen sensor, a temperature sensor, a sweat sensor, a chemical sensor, and/or an infrared sensor.

Figure 5:
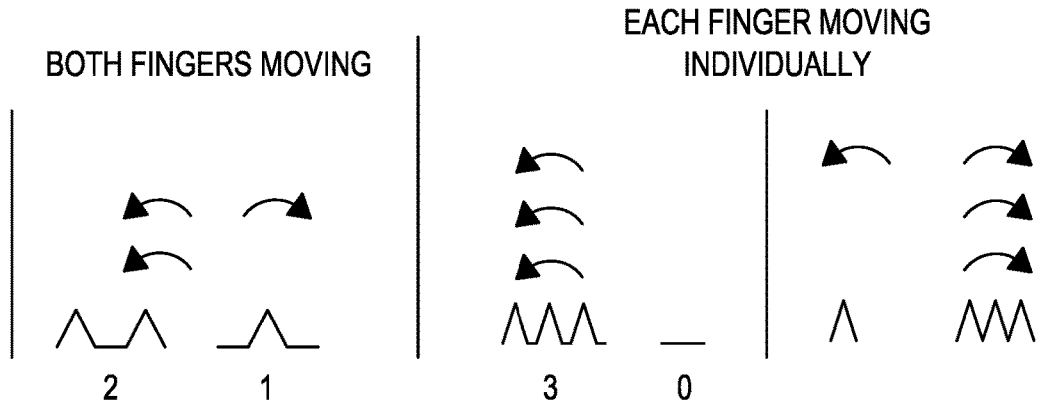
FIG. 5 shows a view of a plurality of pressure sensor inputs in accordance with an exemplary embodiment of the present disclosure.
Figures 6, 7, 8:
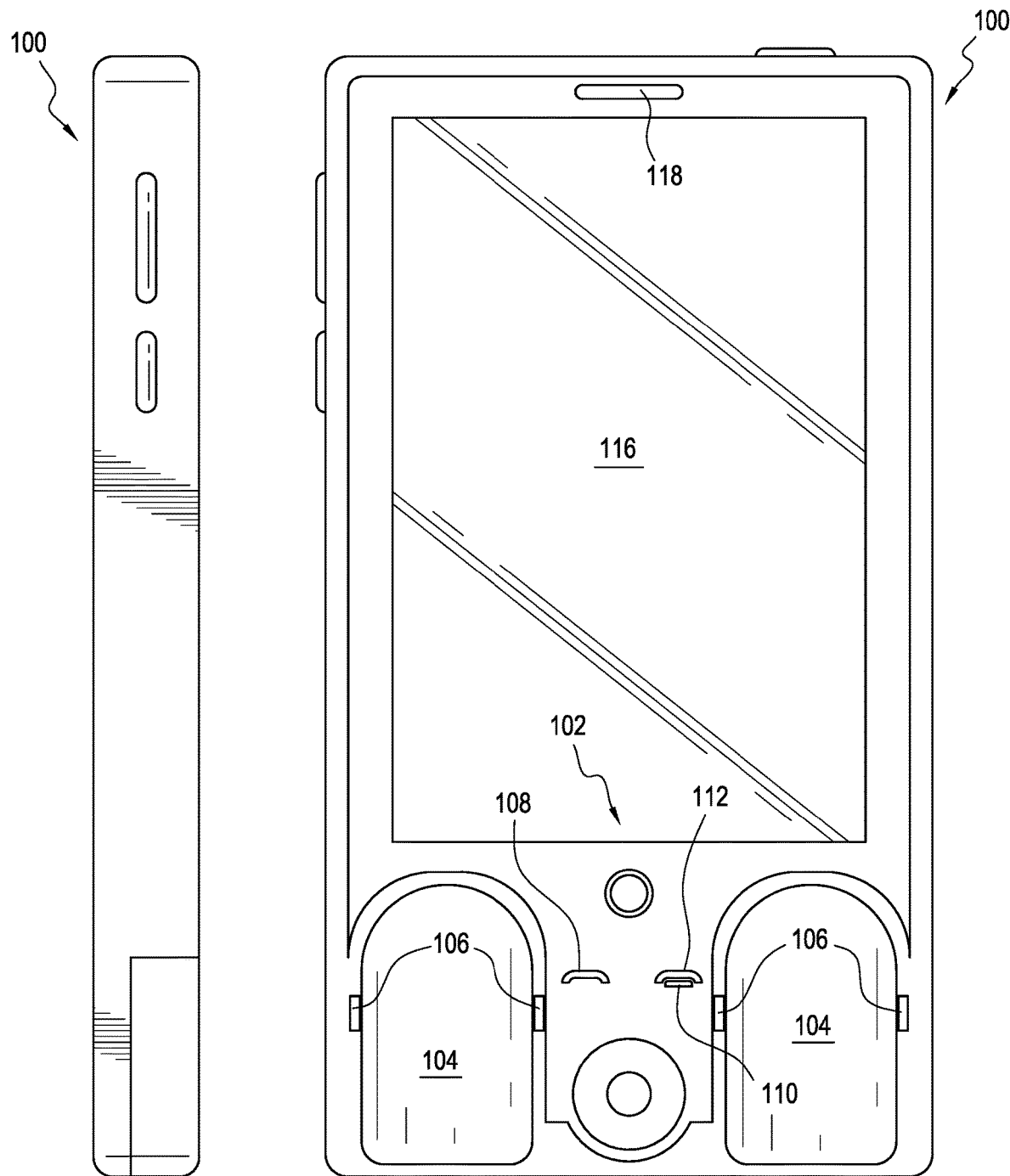
FIG. 6 shows a plan view of an electronic device incorporating a verification device in accordance with an exemplary embodiment of the present disclosure.
FIG. 7 shows a side view of the electronic device of FIG. 6.
FIG. 8 shows an end view of the electronic device of FIG. 6.
Figure 9:
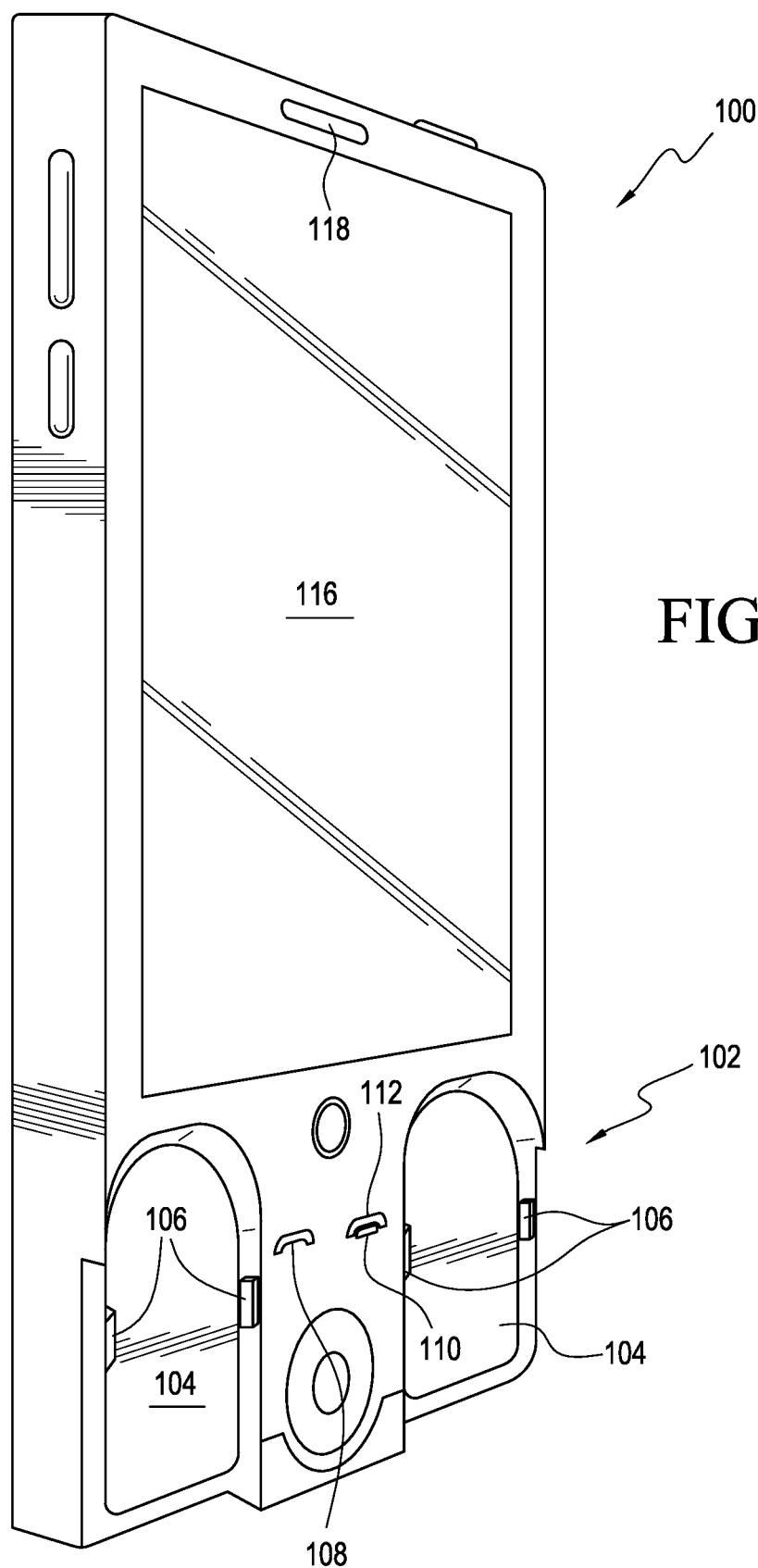
FIG. 9 shows a perspective view of the electronic device of FIG. 6

In order to actuate or activate pressure sensors 14, a user rocks or rolls their fingers, or moves their fingers side-to-side, while maintaining contact with fingerprint sensor pads 12, and contacting pressure sensors 14 on each side of each fingerprint sensor pad 12. For example, as shown in FIG. 5, such rocking motion can be a combination of left and right rolling, rocking, or side-to-side motions. If fingers from the same hand are used, it is anticipated that both left and right pressure sensors 14 will be actuated at approximately the same time. Motions can include: a plurality of actuations on one side, followed by a plurality of actuations on another side, followed by more actuations on the one side; and alternating patterns of actuations, such as left, right, left, left, right, etc. Additionally, device IO can accept inputs from fingers on two different hands, which permits individual rocking, rolling, or side-to-side motions by each finger individually, or nearly simultaneously, to create a complex and difficult-to-break sequence. Further, device IO can also be configured to sense pressure levels and the time of pressure levels. It should be understood that the plurality of pressure sensors can be described as an input code device, as can other input devices that accept a code as described herein. As an example, a full authorization sequence could be: left low pressure for less than one second; right high pressure (without any time requirement); right high pressure for two seconds; left low pressure (without any time requirement). Of course, such combinations are unlimited, with varying lengths of time, varying pressure levels, and varying numbers of actuations, all while requiring the presence of authorized fingerprints. It should be understood that in an exemplary embodiment fingerprint recognition occurs as a first step followed by the authorization sequence, and the authorization sequence may occur after the finger is removed from the fingerprint sensor.

A verification device can be configured as an integral part of another device, such as an ATM, a point-of-sale device, a credit card reader, etc. For example, as shown in FIGS. 6-9, a mobile communication device, indicated generally at 100, includes a verification device 102 in accordance with an exemplary embodiment of the present disclosure. Similar to verification device 10, device 100 includes fingerprint sensor pads 104 and pressure sensors 106. Indicators can be configured as small lighted portions on device 100, to include a positive verification indicator 108, an unconfirmed verification indicator 110, and a negative verification indicator 112. However, it should be understood that a single indicator may include a plurality of colors to indicate the functions provided by a plurality of functions, or device 100 can be configured to include a display 116 to provide the verification indicator functions. Device 100 may further include, for example, a connector or output/input 114 for connection to another device, a wireless communication device (not shown), an audio speaker or output 118, etc. It should be understood that the present device 100 can operate without positive verification indicator 108, unconfirmed verification indicator 110, and/or negative verification indicator 112. In an embodiment without indicators 108, 110, and 112 successful operation such as unlocking a door indicates a positive verification, and lack of proper function (such as not unlocking the door after entering a verification code) indicates negative verification or unconfirmed verification.

Figure 10:
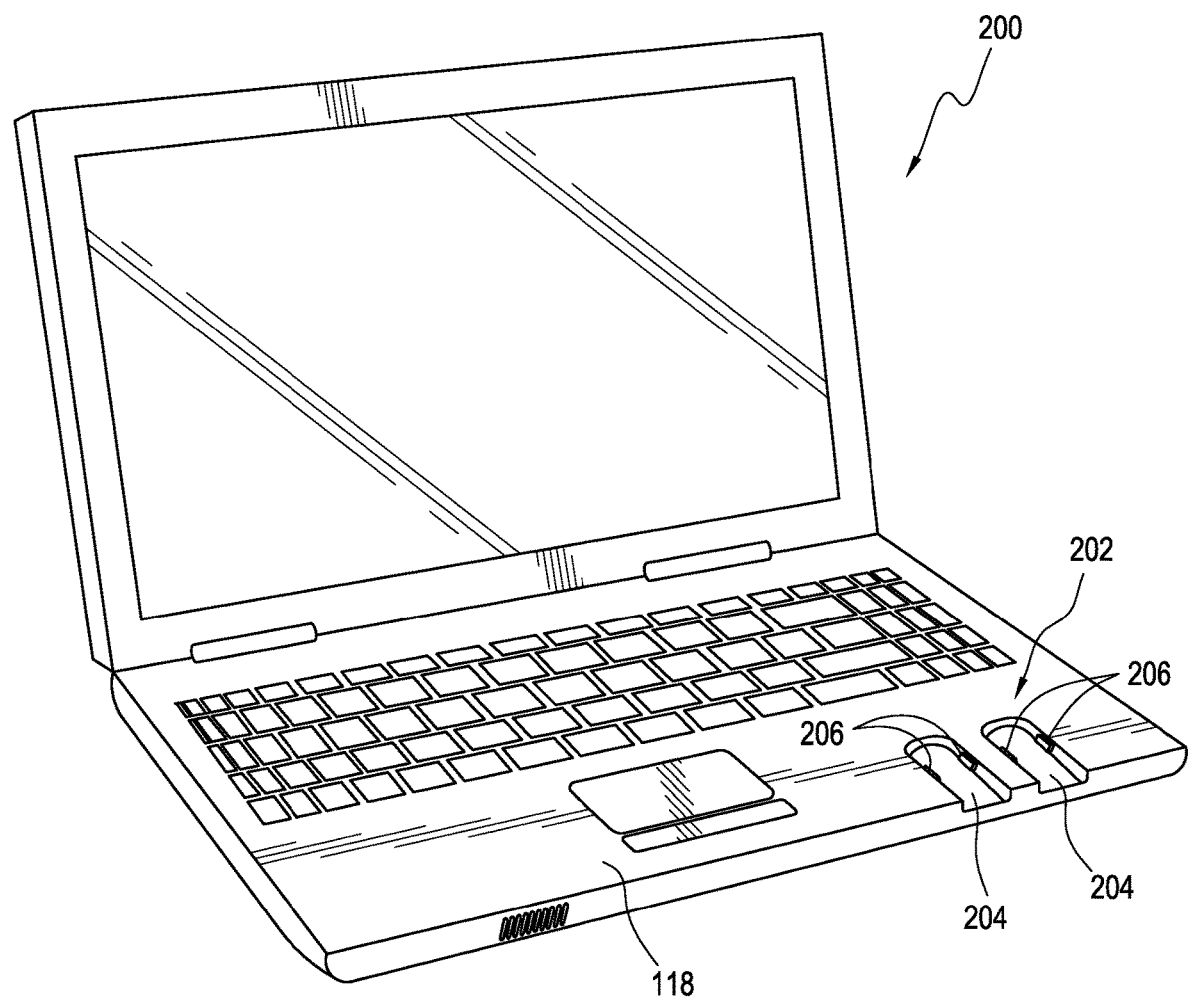
FIG. 10 shows a plan view of another electronic device incorporating a verification device in accordance with an exemplary embodiment of the present disclosure.

FIG. 10 shows a view of another device in which a verification device can be configured as an integral part of the device in accordance with an exemplary embodiment of the present disclosure, indicated generally at 200. Device 200 may be a laptop or other personal computer, which includes a verification device 202. Similar to verification devices 10 and 100, device 202 includes fingerprint sensor pads 204 and pressure sensors 206. Computing device 200 is configured to include a display 216 that can be used to provide display of verification indicators similar in function or capability to verification indicators 16, 18, and 20 of device 10. Alternatively, computing device 200 includes a device body 118 that can be configured to include separate lights (not shown) to provide the functionality of verification indicators 16, 18, and 20. Device 200 may further include, for example, one or more connectors or outputs/inputs (not shown) for connection to another device, a wireless communication device (not shown), an audio speaker or output 120, etc.

Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments including active or electronic elements, the various actions could be performed by specialized circuits (e.g., discrete logic gates interconnected to perform a specialized function), by program instructions (software), such as logical blocks, program modules etc. being executed by one or more processors (e.g., one or more microprocessors, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a non-transitory, machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the systems of the present disclosure are illustrated and discussed herein as having various modules and units, which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Figure 11:
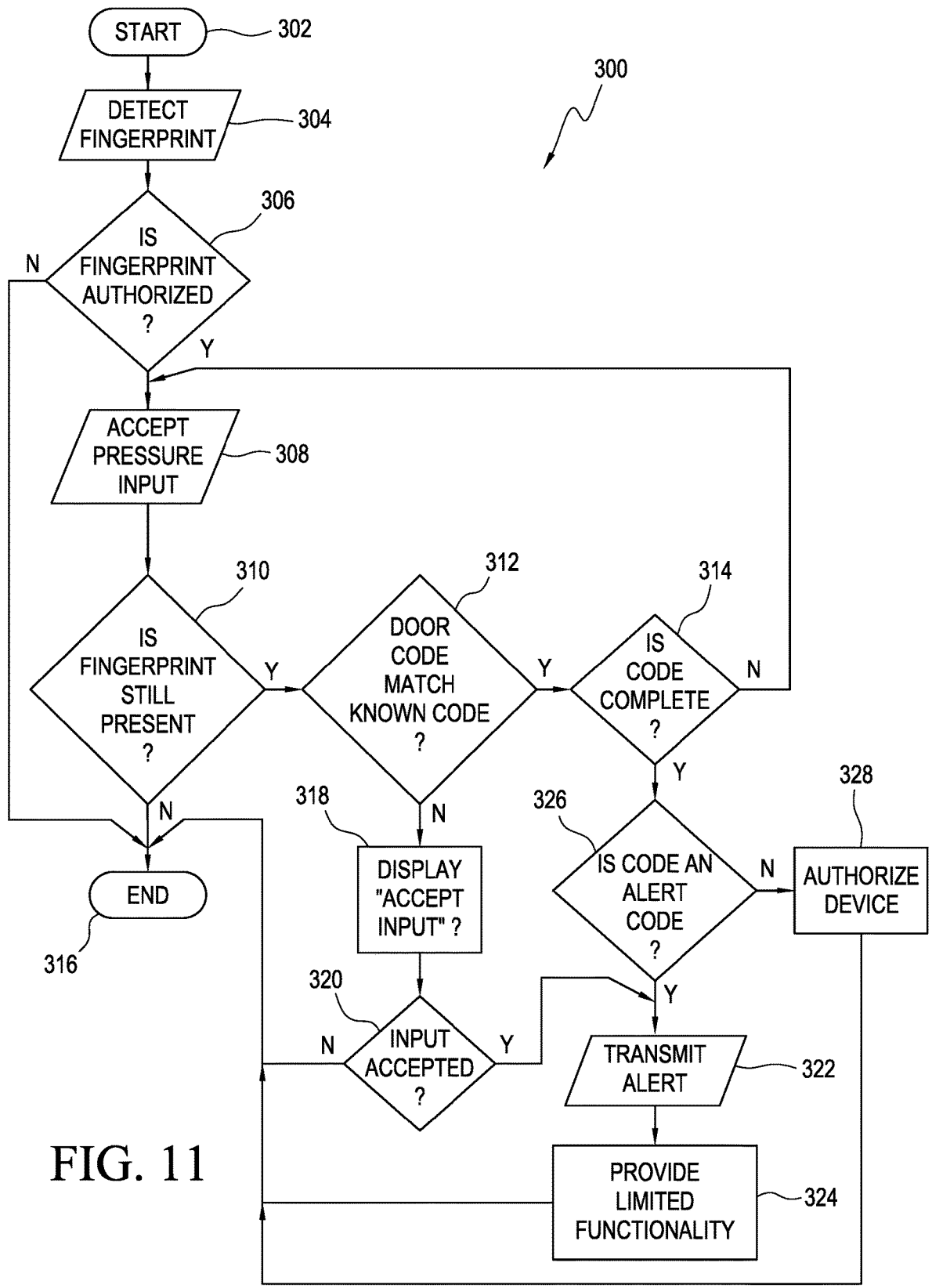
FIG. 11 shows a process flow of a verification device in accordance with an exemplary embodiment of the present disclosure.

The ability to authorize the use of a device, or even software of a device, can be accomplished by many different processes. FIG. 11 includes a verification process in accordance with an exemplary embodiment of the present disclosure, indicated generally at 300. Verification process 300 begins with a start process 302, which can include providing power to a device, such as device 10, device 100, or device 200, initiating software, initiating input/output processes, etc. Once start process 302 is complete, control passes to a detect fingerprint process 304.

In detect fingerprint process 304, one or more fingerprint sensor pads, such as fingerprint sensor pads 12, 104, and 204, determine whether a fingerprint is present. If a fingerprint is present, it is analyzed. Control then passes from detect fingerprint process 304 to a fingerprint authorized decision process 306.

In fingerprint authorized decision process 306, verification process 300 determines whether a fingerprint is actually present; i.e., if an object is detected on the fingerprint sensor pad, does that object have a fingerprint. Additionally, fingerprint authorized decision process 306 determines whether the fingerprint corresponds to an authorized fingerprint. If the object does not include a fingerprint, or the fingerprint is not authorized, control passes from fingerprint authorized decision process 306 to an end process 316, where verification process 300 ends. If authorized decision process 306 detects an authorized fingerprint, control passes from authorized decision process 306 to an accept pressure input process 308.

In accept pressure input process 308, inputs from a pressure sensor, such as pressure sensors 14, 106, or 206, is accepted. Once the input is accepted, control passes from accept pressure input process 308 to a fingerprint presence decision process 310, which determines whether the valid fingerprint is still present on the fingerprint pad. If the valid fingerprint has been removed, control passes from fingerprint presence decision process 310 to end process 316. If the valid fingerprint is still present, control passes from fingerprint presence decision process 310 to code match decision process 312.

In code match decision process 312, verification process 300 determines whether the inputs received thus far from the pressure sensors matches a predetermined pressure code, which can include combinations of left and right pressure sensor inputs, pressure level variations, and pressure inputs for varying lengths of time. If the inputs tentatively match a known or predetermined code, control passes from code match decision process 312 to a code complete decision process 314.

In code complete decision process 314, a determination of whether an entire input pressure code has been received. If the entire code has not been received, control returns to accept pressure input process 308, and verification process 300 continues as previously described. If the entire pressure code has been received, control passes from code complete decision process 314 to an alert code decision process 326.

In alert code decision process 326, a determination of whether the predetermined pressure code is an alert code is determined. An alert code is a predetermined code that can be created prior to purchase by an end user, programmable by an end user, or downloadable by an end user. An alert code can be, for example, a code to inform the police that the user is being forced to unlock or provide authorization to the device, along with identification information that can include GPS information. If the predetermined pressure code is an alert code, control passes from alert code decision process 326 to a transmit alert process 322, described in more detail herein below. If the predetermined pressure code is not an alert code, control passes to an authorize device process 328, where the associated device is fully unlocked because the user has been verified and authorized to use the device. Control then passes from authorized device process 328 to end process 316.

Returning to code match decision process 312, if the pressure code does not match any known code, control passes from code match decision process 312 to a display acceptance process 318. Display acceptance process 318 provides an authorized user an option to ignore a falsely entered code because this process occurs only in the event of an incorrect code. Control then passes to an input accepted decision process 320.

In input accepted decision process 320, if the user did not accept the input, i.e., the incorrectly entered pressure code, control passes from input accepted decision process 320 to end process 316. If the incorrect pressure code is not accepted, control passes to transmit alert process 322.

In transmit alert process 322, an alert corresponding to a predetermined alert code is transmitted, without providing notification to the user. For example, if the predetermined alert code is to notify the police that the user is being forced to unlock a device, an alert, which may include a text message, a computer file, predetermined voice recording, etc., is transmitted to the police by one or more of internet, Wi-Fi, landline, wireless, etc. Such transmission may include location information, identification information, GPS information, etc. In some circumstances, an open transmission line to the alerted authority may be opened so that the events at the device may be monitored during response to the alert. Once the alert is transmitted, control passes from transmit alert process 322 to a provide limited functionality process 324.

In limited functionality process 324, the device is enabled to provide limited functionality that does not include access to sensitive information stored on the device, such as computer files, and may limit the ability to access wireless and internet services. For a system such as a vehicle, limited functionality could indicate a false low or no fuel reading, an engine warning light, a service engine light, thus preventing a would be kidnapper or carjacker from using the vehicle to transport the victim. The benefit of such limited functionality is that it encourages an unauthorized user to continue to use the device while an alerted authority responds to the alert provided in transmit alert process 322. Once the limited functionality has been provided, control passes from provide limited functionality process 324 to end process 316. It should be understood that verification process 300 can be performed again to restore fully functionality to an associated device.

Figure 12:
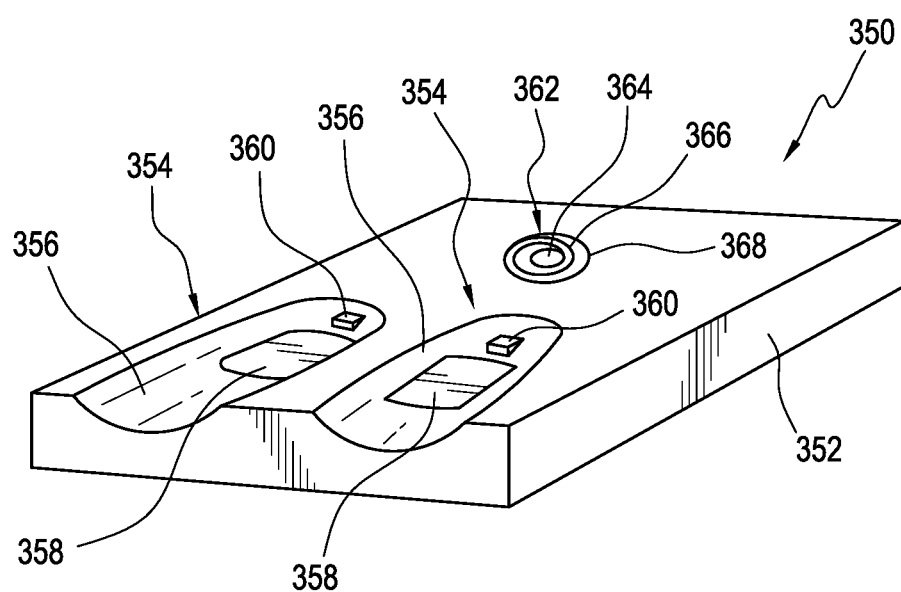
FIG. 12 shows a perspective view of a verification device in accordance with another exemplary embodiment of the present disclosure.

FIG. 12 shows a perspective view of a verification device, shown generally at 350, in accordance with another exemplary embodiment of the present disclosure. Verification device 350 includes a casing, housing, or body 352. Body 352 supports at least one interface location 354 configured to receive a finger. Interface location 354 can include a conformal shape 356 formed in body 352 that is approximately the same shape as a human finger. Located on the surface of conformal shape 356 is a fingerprint sensor 358 and a control, input, or sensor 360. Control, input, or sensor 360 can be, for example, an optical or light sensor, which can be actuated by blocking light, a motion type sensor capable of sensing movement, a button or switch, or another device configured to sense movement of the user's finger. Verification device 350 is configured to receive a user's fingerprint information, which, as described further herein, is transmitted to a processor for comparison with a baseline fingerprint. Once the fingerprint has been verified, the user can enter a code by way of control, input, or sensor 360 while the fingerprint is monitored.

It should be understood that in another embodiment the fingerprint can be acquired by fingerprint sensor 358 and verified as a first step, and then fingerprint sensor 358 is deactivated. In a second step that is initiated after positive verification of the fingerprint, sensor 360 is activated, and the authorized user can then enter a code by way of control input or sensor 360.

Verification device 350 can further include one or more indicators 362 that are configured to provide an indication of the status of identification and an alert transmission, described in more detail elsewhere herein. Indicator 362 can include a plurality of lights or a display. In the embodiment of FIG. 12, indicator 362 includes three concentric illuminated features, 364, 366, and 368. Illuminators 364, 366, and 368 can be configured to provide indications of the status of verification device 350 and associated functions. For example, during a fingerprint acquisition and identification phase, illuminator 364 can be turned on. Such illuminator can be configured to include a color, such as yellow, to indicate identification. If identification fails, illuminator 364 can illuminate red, or all three illuminators 364, 366, and 368 can illuminate red, or another color, and can flash. If identification of the fingerprint is successful, illuminator 364 can turn to green or blue, and illuminator 366 can turn to yellow, indicating that verification device 350 is awaiting entry of a code. If the correct code is entered, illuminator 366 can turn to green. If the incorrect code is entered, illuminator 366 can turn to red, as can illuminator 368, and one or both illuminators can flash red to indicate the code was incorrect while maintaining a green light on illuminator

364. If an alert code, described in more detail elsewhere herein, is entered, illuminator 368 can turn green, indicating that the alert code was recognized and a message to authorities was successfully transmitted. Alternatively, if the alert code was recognized, but authorities were not alerted due to a malfunction, illuminator 368 can initially illuminate with yellow or red light, and then either turn off or turn to another color, such as blue, continuing to indicate that while the alert code was received, authorities were not alerted for some reason. It should be understood that illuminator 368 may be programmed to illuminate green when an alert code is entered, thereby the assailant is tricked into thinking that all is well, but in reality the police was called because an alert code was entered. If the red code illuminates, an assailant can become upset and harm the victim, thus once alert code is entered the green light will be illuminated and, for instance, a safe is unlocked.

Figure 13:
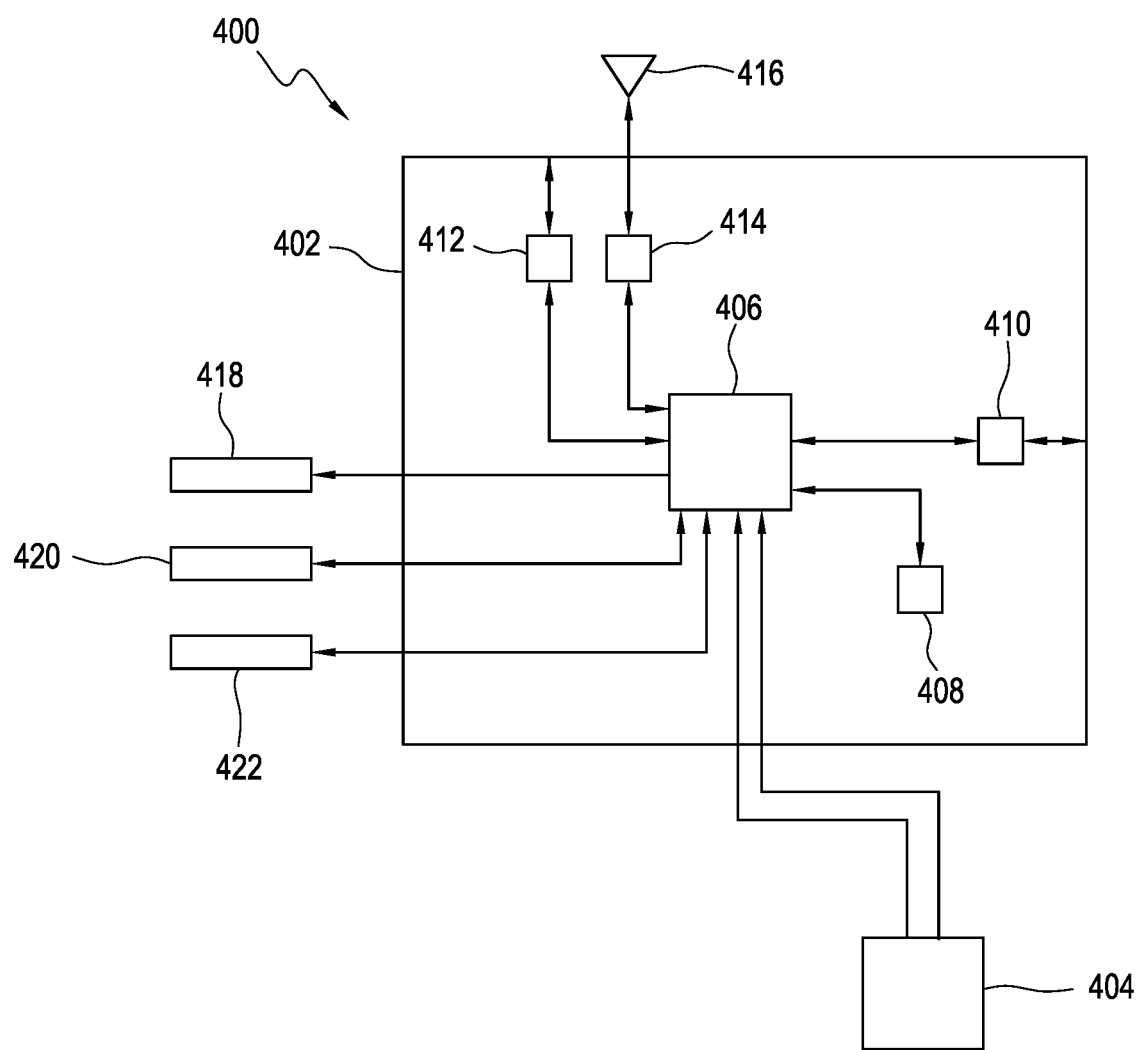
FIG. 13 shows a block diagram of a system incorporating a verification device in accordance with an exemplary embodiment of the present disclosure.

FIG. 13 is a block diagram of a system, indicated generally at 400, incorporating a verification device in accordance with an exemplary embodiment of the present disclosure. System 400 is exemplary of, for example, an ATM, a mobile communication device, a computer such as a laptop, a vehicle, etc. System 400 includes a casing, housing, or body 402 used to support or contain certain elements of system 400, and a verification device 404, which can be any verification device disclosed herein or any verification device constructed according to the principles of the present disclosure. System 400 further includes a processor 406, nontransitory memory 408, a landline modem or interface 410, a cable modem or internet interface 412, a transceiver or transmitter 414, and an antenna 416. System 400 can further include or control one or more auxiliary devices or systems, such as an audio output device 418, one or more cameras 420, and other devices 422, such as lights, a display, etc.

Verification device 404 is configured to provide a plurality of output signals to processor 406. For example, the output of one or more sensors, such as the fingerprint sensor, is transmitted to processor 406. In addition, codes entered by a user are transmitted to processor 406. Processor 406 also communicates with non-transitory memory for access to software and stored data, as well as storing data. Processor 406 further communicates with one or more devices for remote communication, such as landline modem or interface 410 for communication over conventional telephone lines, cable modem or internet interface 412 for communication by way of the internet, and transceiver or transmitter 414 for wireless communication. It should be understood that wireless communication is a term that includes near field and far field wireless communication, including satellite communication.

Processor 406 may also control other devices, such as audio device 418 for providing voice or tonal output, which may be co-located with verification device 404 to provide verbal confirmation of entries or assistance for visually impaired persons. Processor 406 can also control or turn on and receive data from one or more cameras 420, including cameras co-located with verification device 404. If data is received from cameras 420, it can be processed for determination of risk to a user, or determination that the user is not authorized. Such data can be stored in non-transitory memory 408, which can be co-located with system 400, or can be remotely located, for example, in cloud storage. In addition, processor 406 can control other devices 422, which may include additional lights, alarms, locking systems, etc.

Figure 14:
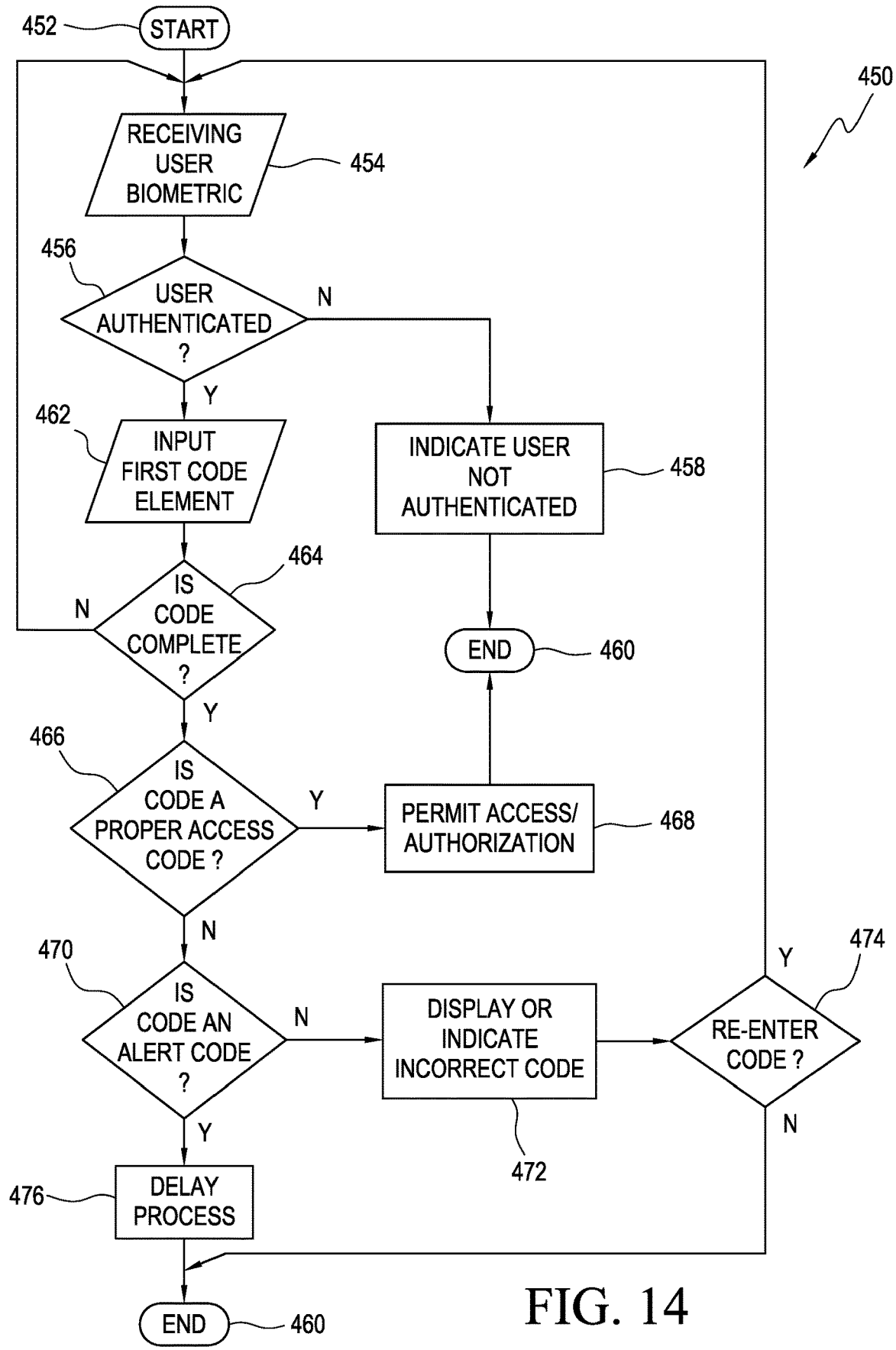
FIG. 14 shows a process flow of a verification device in accordance with another exemplary embodiment of the present disclosure.

FIG. 14 shows a view of a process flow, indicated generally at 450, of a verification device in accordance with another exemplary embodiment of the present disclosure. Process 450 can be used in conjunction with any verification device constructed according to the principles of the present disclosure and incorporated as part of a system having the features of process 450.

Process 450 begins with a start process 452, where software may be loaded, or firmware access, registers may be cleared, indicators, such as illuminators 364, 366, and/or 368, are actuated to indicator startup is in progress. Once start process 452 is complete, control passes from start process 452 to a receive user biometric process 454.

In receive user biometric process 454, the user's fingerprint is scanned and transmitted by the verification device to the processor for analysis and determination of the user's identity. Once the analysis is complete, control passes from receive user biometric process 454 to a user authenticated decision process 456. If the user was not authenticated, control passes from user authenticated decision process 456 to a indicate user not authorized process 458, where an indicator, such as illuminators 364, 366, and/or 368 provide an indication that the user was not authenticated. Control then passes from user not authenticated process 458 to an end process 460, which terminates process flow 450. Returning to user authenticated decision process 456, if the user is authenticated, control passes from process 456 to an input first code element process 462.

In input first code element process 462, a first user code input into the verification device is transmitted to the processor, which holds the code for later verification. Control then passes from input first code element process 462 to a code complete decision process 464. If a code is, for example, six code entries, then the code is not complete with a single entry, and control will pass from code complete decision process 464 to receive user biometric 454, and process 450 functions as previously described. If a complete input sequence has been received, control passes from code complete decision process 464 to a proper access code decision process 466.

In proper access code decision process 466, a determination of whether the code is a proper access code is determined. In this context, the term proper means an access code that provides full access to the user as authorized by such a code. If the entered code is a proper access code, control passes from proper access code decision process 466 to a permit access/authorization process 468, where predetermined access is provided to the user. Once access is provided, process 450 is complete and control passes to an end process 460. In an actual device, end process 460 is only an end of process 450, and other processes will continue to operate.

Returning to proper access code decision process 466, if the access code is not a proper access code control passes from proper access code decision process 466 to an alert code decision process 470, where a determination is made as to whether the code is an alert code. If the code is not an alert code, control passes from alert code decision process 470 to a display incorrect code process 472, which displays, such as by illuminators 364, 366, and/or 368, an indication that an incorrect code was entered. Control then passes from display incorrect code process 472 to a re-enter code decision process 474. If the user is going to try again, control passes from re-enter code decision process 474 to process 454, described hereinabove. If the user is not going to try again, control passes from reenter code decision process 474 to end process 460, also described hereinabove.

Returning to alert code decision process 470, if the user entered code is an alert code, control can pass to a delay process 476, described in more detail elsewhere herein. Once delay process 476 is finished, control passes from delay process 476 to end process 460, described elsewhere herein.

Figure 15:
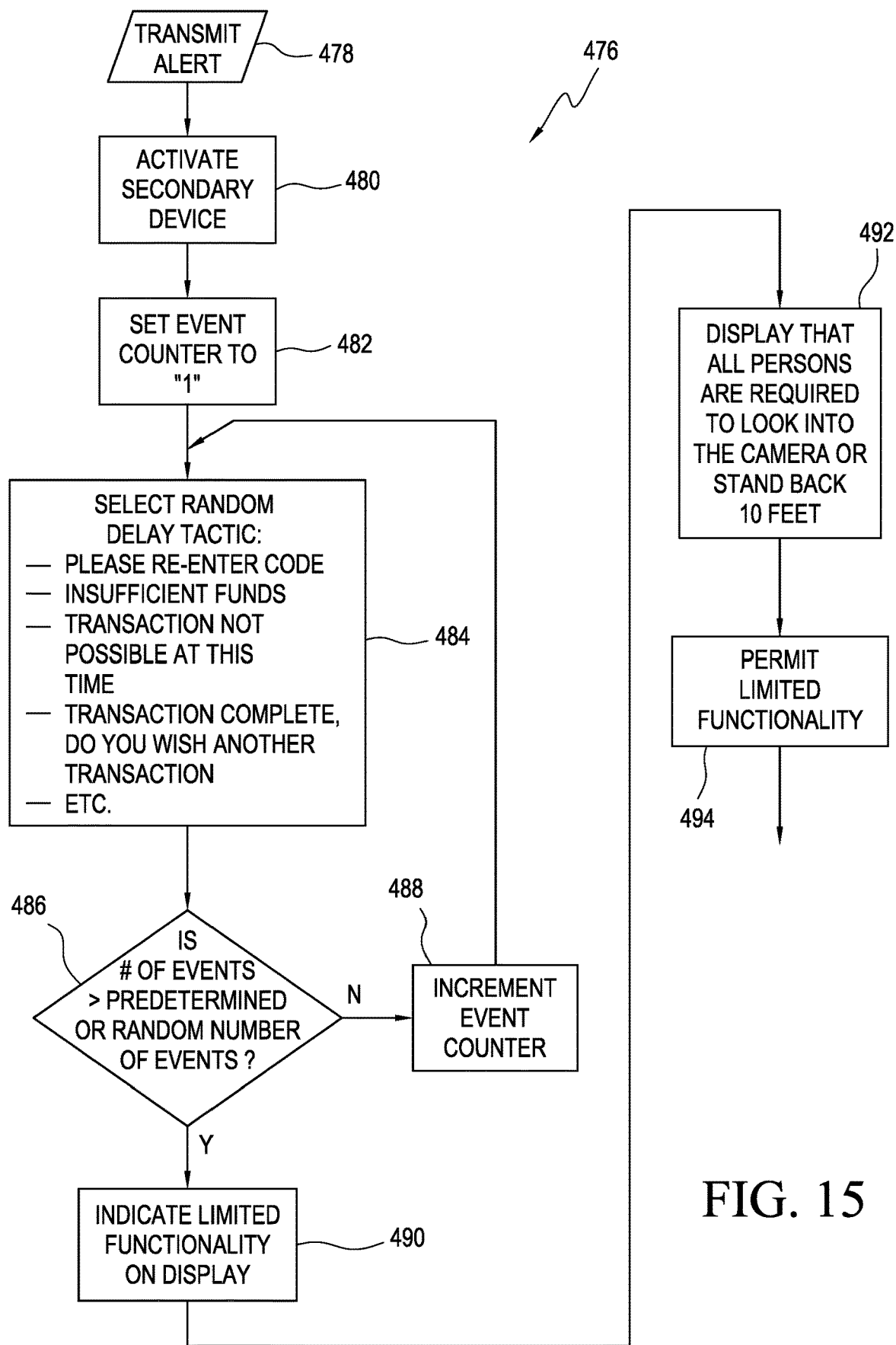
FIG. 15 shows a delay process of the process flow of FIG. 14 in accordance with an exemplary embodiment of the present disclosure.

FIG. 15 shows delay process 476 of the process flow of FIG. 14 in accordance with an exemplary embodiment of the present disclosure. After process 450 identifies a user entered code as an alert code, control passes to a transmit alert process 468, where an alert is transmitted to, for example, a police agency, the FBI, Homeland Security, or other appropriate authority, indicating that the user is under active threat at the location of the verification device. Such alert can be transmitted via landline, internet, and/or wireless communication. Once an alert is transmitted, control passes from transmit alert process 478 to an activate secondary device process 480.

In activate secondary device process 480, a device such as a camera, warning lights, or other device associated with an alert can be actuated, activated, or operated. It should be understood that this step may not exist or provide functionality in all systems. Once activate secondary device process 480 is complete, control passes from activate secondary device process 480 to a set event counter process 482, which set the event counter to an initial value, such as "I." Control then passes from set event counter process 482 to a delay tactic process 484.

The purpose of delay tactic process 484 is to provide proper authorities, such as police, FBI, Homeland Security, etc., time to respond to the location of the authentication device. The delays are intended to use as much clock time, such clocks being integral to the process of, for example, system 400, or available via internet, landline, or wireless communication, as possible. The delays are chosen to be realistic, and are also chosen to minimize the risk of alarming or making a hostile individual who might be coercing the user angry and prone to violence. The potential delays can be, for example, a display indication to re-enter an authorization code, an insufficient funds indication-even though the associated account has a higher amount available, an indication that a transaction is not possible at this time or is temporarily unavailable, such as might occur with an ATM machine that is out of money or is malfunctioning, an erroneous display that the transaction is complete, even though no transaction took place, etc. As noted hereinabove, the goal is to delay a suspect as long as possible, trying to make such delays consistent with actual operating occurrences to reduce the risk that a suspect or coercing individual realizes that an alert code has been entered. As process 476 is recursive or repetitive, as should be apparent from the present disclosure, such delays are randomly chosen, and can be logically ordered to be sequential. For example, one delay may be that communication with the internet is down and the transaction is not possible at this time. A subsequent delay could be that an unknown malfunction has occurred and a transaction is not possible at this time. In other words, once a specific delay is chosen, subsequent delays can be chosen to be logically related to the previous delay. Once a delay tactic is randomly chosen and implemented, control passes from delay tactic process 484 to an event counter decision process 486.

In event counter decision process 486, a determination of whether a predetermined number of events or delays have been reached is made. Such predetermination can be a set number, can be randomly chosen upon entry into process 476, or can be modified based on a randomly chosen delay. Regardless of how the determination of predetermined number of delays is made, if the number of events has not been reached, control passes to an increment event counter process 488, where the event counter is incremented by one. Control then passes from increment event counter process 488 to delay tactic process 484, which functions as described hereinabove.

Returning to event counter decision process 486, if the predetermined number of events or delays has been reached, control passes to a limited functionality process 490, where limited functionality of a system, such as system 400, is indicated on a display. Control then passes from event counter decision process 486 to an optional requirement for a companion identification process 492.

In companion identification process 492, if system 400 determines by camera or other input that a second individual is near the user, and an alert code has been entered, system 400 can indicate or display a requirement for the other individual to either move away by a predetermined distance, such as IO feet, or to move closer to a camera for companion identification. If a display is available, a more thorough requirement can be displayed, again requiring time and indicating to the coercing individual that the user is not at fault. It should be understood that companion identification process 492 is an optional process that can permit the user more privacy, or can potentially gain the opportunity to identify the coercing individual for later apprehension. Once companion identification process 492 is complete, control passes to a permit limited functionality process 494.

In permit limited functionality process 494, as the title indicates, limited functionality of, for example, system 400, is provided and may be indicated on a display, including illuminators 364, 366, and/or 368. Such limited functionality can be, for example, the ability to access a limited amount of money from an ATM, the ability to access a portion of files on a laptop, the ability to start a vehicle, an indication that fuel is low or that engine maintenance is required in a vehicle, etc. The goal of limited functionality process 490 is to convince a coercing individual that the user is trying their best to comply with their demands, but the system or apparatus is clearly not operating correctly. Control then passes from process 490 of process 476 to end process 460, as described hereinabove with respect to FIG. 14.

It should be understood that the present disclosure includes systems in which a verification device operates cooperatively with a second device. By way of example, one such system could be a verification device in combination with a fuel pump or fuel line of a vehicle, wherein the fuel pump or fuel line is configured to stop or cutoff fuel flow an alert code is transmitted. In such an embodiment the assailant can attempt to take the car but the fuel can be shut off immediately to prevent operation, or can be programmed to shut off after a few miles to allow the victim to find safety while the assailant is stopped miles away from the victim, unable to operate the vehicle further. Thus, such an embodiment includes providing limited functionality, as previously described.

FIGS. 16-21 show views of a verification device, indicated generally at 500, in accordance with an exemplary embodiment of the present disclosure. Verification device 500 includes a device body 502, which can include a housing or casing. Verification device 500 further includes a fingerprint scanner or sensor 504 and a motion sensor 506. It should be understood that verification device 500 will either include an integral processor and non-transitory memory, or will be attached, through a direct connection, by a cable or wire, or wirelessly, to a device, apparatus, or system that includes a processor and non-transitory memory, such as system 400 shown in FIG. 13. In an exemplary process, a finger 508 is positioned on fingerprint scanner or sensor 504, as shown in FIGS. 18 and 19, and verification device 500 reads the fingerprint of finger 508. Verification device 500, or a system to which verification device 500 is connected or attached, determines whether the fingerprint is that of an authorized user. An indication that the fingerprint is authorized or accepted, such as those described elsewhere herein, is provided to the user. The user, now an authorized user, then positions finger 508 over motion sensor 506, as shown in FIGS. 20 and 21. Motion of finger 508, which can be side-to-side as shown in FIG. 20 or up and down as shown in FIG. 21, is identified, and a code or sequence of movement, including the length of time between movements, is read by motion sensor 506. It should be understood that the type of motion depends on the type of motion sensor used. For example, a capacitive type sensor can identify up and down movement. In another example, one or more optical sensors can identify side-to-side movement. Once motion sensor 506 receives a completed code, e.g., such as indicated by code complete decision process 464 described with respect to FIG. 14, then the type of code, including alert, limited functionality, and proper authorization for full access, is determined. Thus, verification device 500 can operate as previously described, for example, in FIGS. 14 and 15.

FIGS. 22-27 show views of a verification device, indicated generally at 520, in accordance with an exemplary embodiment of the present disclosure. Verification device 520 includes a device body 522, which can include a housing or casing. Verification device 520 further includes a fingerprint scanner or sensor 524, a motion sensor 526, which can be identical to fingerprint scanner or sensor 504 and motion sensor 506, respectively, and a pressure sensor 528. It should be understood that verification device 520 will either include an integral processor and non-transitory memory, or will be attached, through a direct connection, by a cable or wire, or wirelessly, to a device, apparatus, or system that includes a processor and non-transitory memory, such as system 400 shown in FIG. 13. In an exemplary process, finger 508 is positioned on fingerprint scanner or sensor 524, as shown in FIGS. 24 and 25, while also pressing on pressure sensor 528, and verification device 520 reads the fingerprint of finger 508. Verification device 520, or a system to which verification device 520 is connected or attached, determines whether the fingerprint is that of an authorized user. An indication that the fingerprint is authorized or accepted, such as those described elsewhere herein, is provided to the user. The user, now an authorized user, then positions finger 508 over motion sensor 526, as shown in FIGS. 26 and 27. Motion of finger 508, which can be side-to side as shown in FIG. 26 or up and down as shown in FIG. 27, is identified, and a code or sequence of movement, including the length of time between movements, is read by motion sensor 506. It should be understood that the type of motion depends on the type of motion sensor used. For example, a capacitive type sensor can identify up and down movement. In another example, one or more optical sensors can identify side-to-side movement. Pressure sensor 528 can be contacted or pressed or may not be contacted or pressed during motion of finger 508. Furthermore, pressure on pressure sensor 528 may or may not form part of an input code to verification device 520. For example, an input code sequence may be a first left-right movement while pressing pressure sensor 528, followed by releasing pressing from pressure sensor 528 while performing one or more additional left-right finger 508 movements. Once motion sensor 526, and in some embodiments, pressure sensor 528, receives a completed code, e.g., such as indicated by code complete decision process 464 described with respect to FIG. 14, then the type of code, including alert, limited functionality, and proper authorization for full access, is determined. Thus, verification device 520 can operate as previously described, for example, in FIGS. 14 and 15.

Figure 28:
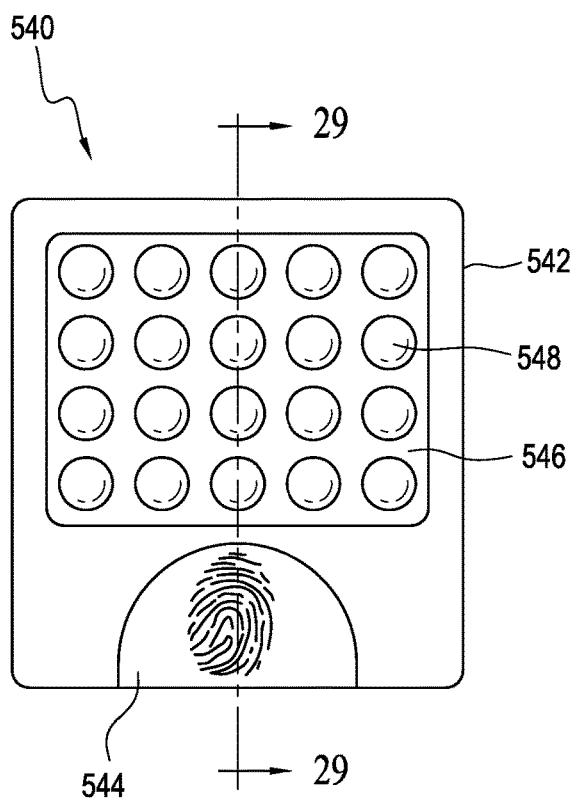
FIG. 28 shows a plan view of a verification device in accordance with an exemplary embodiment of the present disclosure.
Figure 29:
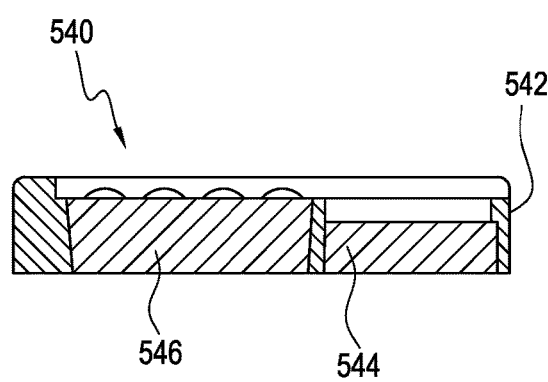
FIG. 29 shows a sectional view of the verification device of FIG. 28 along the lines 29-29

FIGS. 28 and 29 show views of a verification device, indicated generally at 540, in accordance with an exemplary embodiment of the present disclosure. Verification device 540 includes a device body 542, which can include a housing or casing. Verification device 540 further includes a fingerprint scanner or sensor 544 and a touch sensitive panel of LED's 546. It should be understood that verification device 540 will either include an integral processor and non-transitory memory, or will be attached, through a direct connection, by a cable or wire, or wirelessly, to a device, apparatus, or system that includes a processor and non-transitory memory, such as system 400 shown in FIG. 13. In an exemplary process, finger 508 is positioned on fingerprint scanner or sensor 544, similar to the process described with respect to FIGS. 18 and 19, and verification device 540 reads the fingerprint of finger 508. Verification device 540, or a system to which verification device 540 is connected or attached, determines whether the fingerprint is that of an authorized user. An indication that the fingerprint is authorized or accepted, such as those described elsewhere herein, is provided to the user. The user, now an authorized user, then contacts individual LED's, each of which is associated with a touch sensitive switch and each of which is provided with a color, such as red, green, and blue, to facilitate memorization of an input code. An input code using LED's 548 can include input LED 548 position and/or the colors or LED's 548. Verification device 540 receives a sequence of inputs to LED's 548. Once a completed code is input using LED's 548, e.g., such as indicated by code complete decision process 464 described with respect to FIG. 14, then the type of code, including alert, limited functionality, and proper authorization for full access, is determined. Thus, verification device 540 can operate as previously described, for example, in FIGS. 14 and 15.

Figure 31:
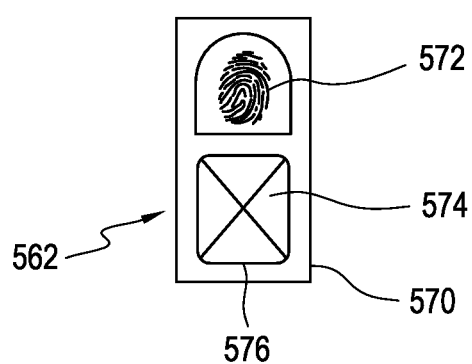
FIG. 31 shows a view of the verification device of FIG. 30.
Figure 32:
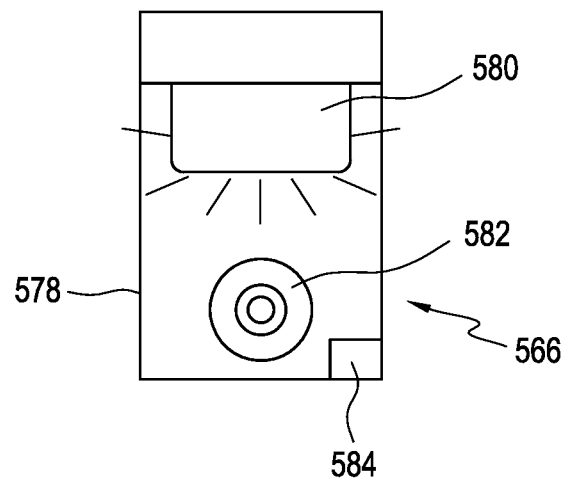
FIG. 32 shows a further view of an alert apparatus or device of FIG. 30.
Figure 30:
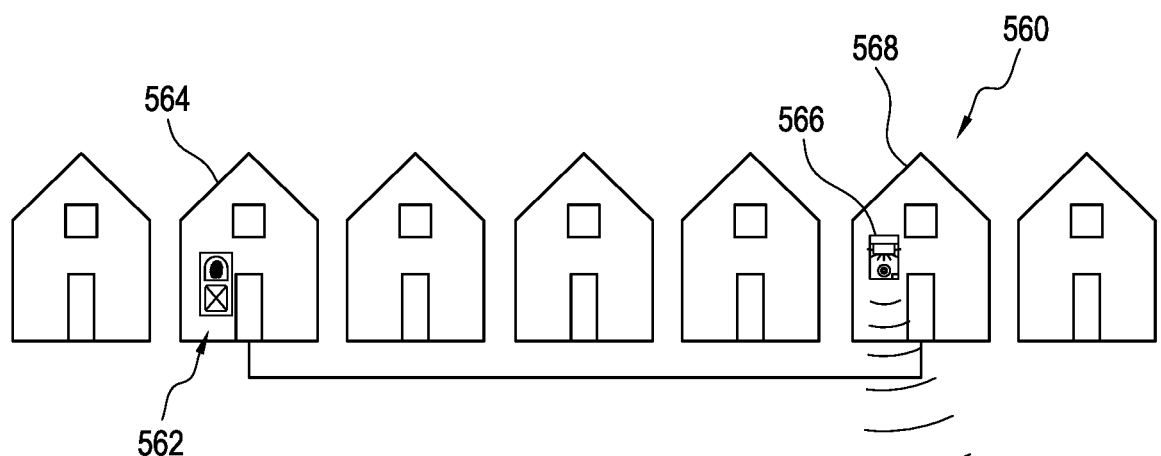
FIG. 30 shows a system incorporating a verification device in accordance with an exemplary embodiment of the present disclosure.
Figure 30:
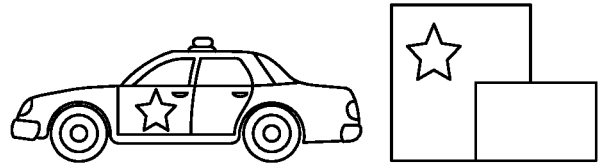

FIGS. 30-32 show views of a verification and alert system, indicated generally at 560, incorporating a verification device, indicated generally at 562, in accordance with an exemplary embodiment of the present disclosure. Verification device 562 can be included in or on a first house 564. System 560 further includes an alert station 566 positioned or located on or in a second house 568. Verification device 562 includes a fingerprint scanner 572 and an ID pad 574. ID pad 574 can be a keypad or other input device. In the exemplary embodiment of FIG. 31, ID pad 574 includes a plurality of color coded buttons 576. Alert station 566 includes an alert station body 578, which can include a housing or casing, a signal light 580, an audible alarm 582, and a transmitter 584. After the authorized user scans their fingerprint using fingerprint scanner 572, the authorized user is able to enter an alert code using color coded buttons 576. It should be noted that the authorized user will not receive any indication that an alert code has been entered, thus an unauthorized person trying to coerce the homeowner into disarming an alarm or other system by way of verification device 562 will be unaware that an alert code is being transmitted. Verification device 562 can be connected to alert station 566 located at second house 568 by a wired connection or a wireless connection. Alert station 566 can actuate signal light 580 and audible alarm 582 as well as automatically contacts appropriate authorities, such as police, sheriff, etc., by way of, for example, transmitter 584.

Figure 34:
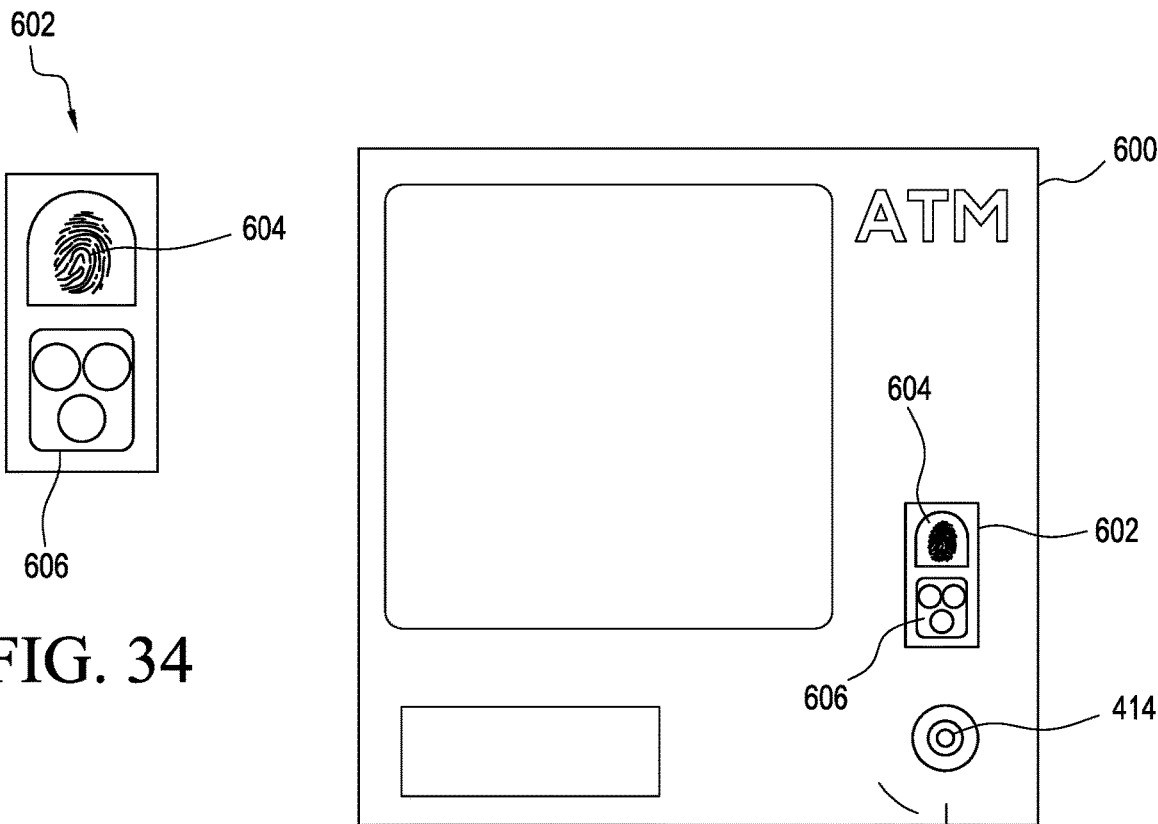
FIG. 34 shows a view of the verification device of FIG. 33.
Figure 33:
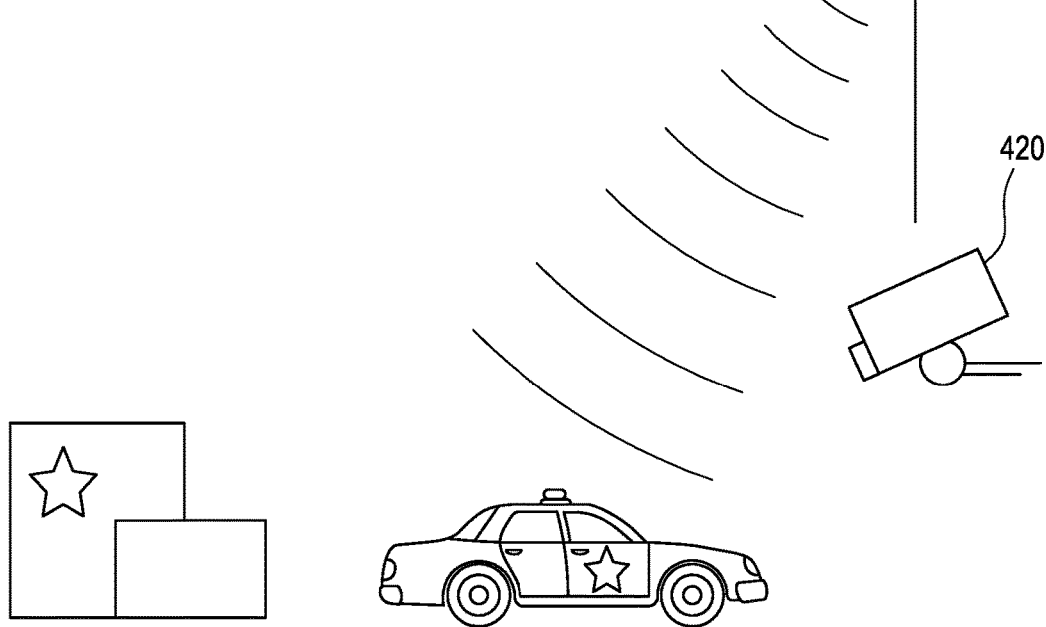
FIG. 33 shows a view of a system incorporating a verification device in accordance with an exemplary embodiment of the present disclosure.

FIGS. 33-34 show views of an ATM 600 incorporating a verification device 602 in accordance with an exemplary embodiment of the present disclosure. Verification device 602 includes a fingerprint scanner 604 and an input keypad 606, which can include touch sensitive buttons that incorporate LED's. As with other embodiments described herein, a user scans a finger. Once the finger is authenticated, the user is authenticated, and is then able to enter an alert code into input keypad 606 without an unauthorized user being aware of the alert code. The alert code can be transmitted as shown in FIG. 13 and described in associated text.

FIGS. 35-38 show views of a system incorporating a verification device, indicated generally at 430, in accordance with an exemplary embodiment of the present disclosure. Verification device 430 is connected via, for example, an intranet (not shown) to a programmable coding apparatus, indicated generally at 432, in accordance with an exemplary embodiment of the present disclosure. Verification device 430 includes a fingerprint scanner 434 and a keypad 436, both of which can function as described elsewhere herein. Programmable coding apparatus 432 includes a fingerprint scanner 438, a keypad that can be identical to the keypad on verification device 430, a camera 438, and a display 440. Programmable coding apparatus 432 can be located at, for example, a front desk 442. When a user checks into a hotel or motel, or other establishment, the user scans their fingerprint using programmable coding apparatus 432. Camera 438 can take a picture of the user as well. Once programmable coding apparatus 432 acquires a fingerprint, the user becomes an authenticated user and can enter one or more codes into keypad 436 of programmable coding apparatus 432. In an exemplary embodiment, the authorized user selects at least 2 codes, one for regular operation and one for alert, and preferably one for limited functionality. The codes are associated by a clerk with a hotel room number, and the information entered by the authorized user is stored, for example, in non-transitory memory 408. If the authorized user sees suspicious activities or an assailant follows the user, and attempts to force entry, the authorized user then inputs the alert code chosen by the user, which despite opening the door, will also contact security at the hotel (indicating hotel guest at risk), and if the limited functionality code is entered, there is a delay in opening the door, which may provide sufficient time to allow security to arrive before assailant enters the hotel room. Thus, verification device 430 and programmable coding apparatus 432 in combination form a security system for the authorized user.

Figure 39:
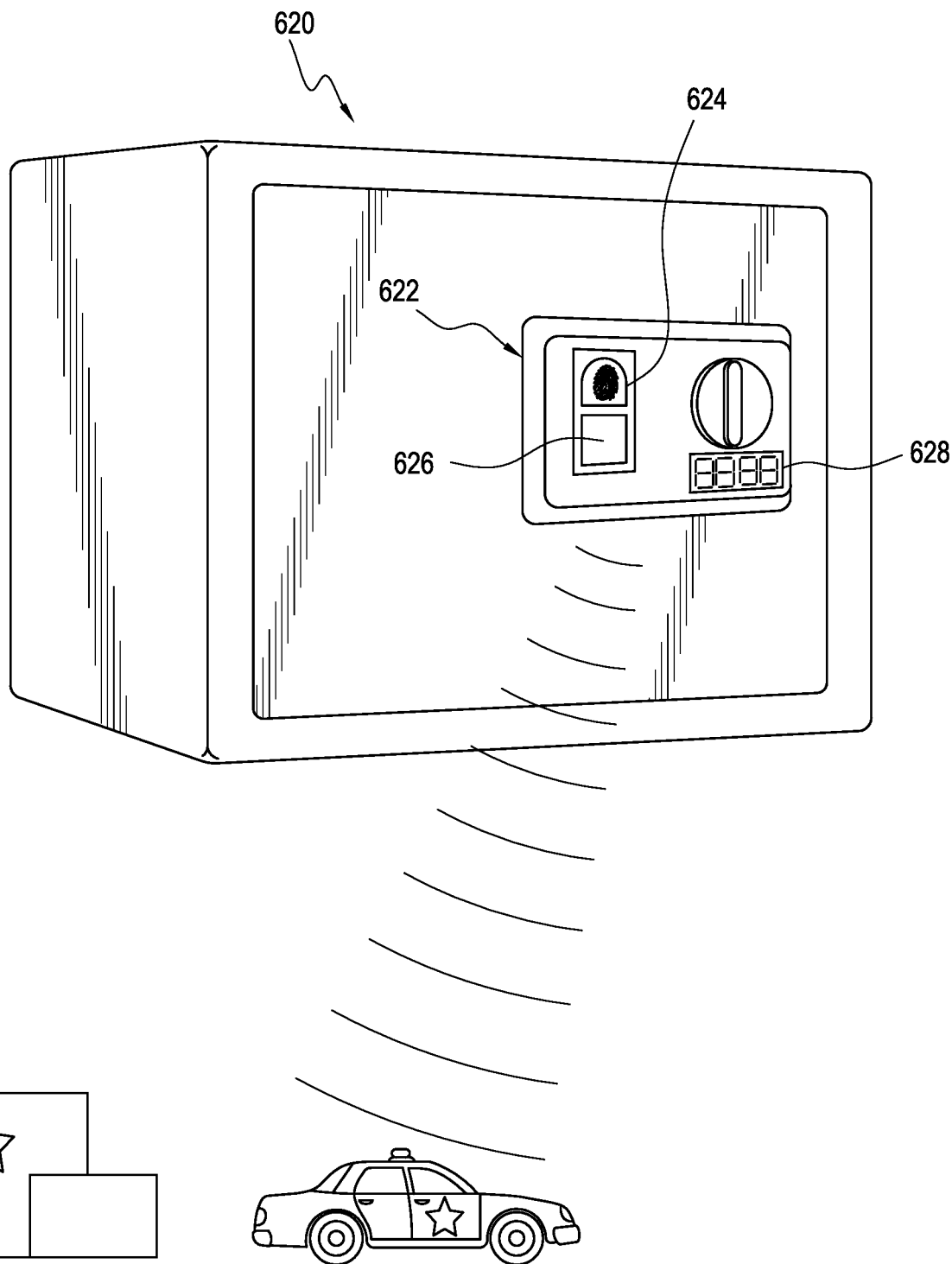
FIG. 39 shows a view of yet another system incorporating a verification device in accordance with an exemplary embodiment of the present disclosure.

FIG. 39 shows a view of yet another system in the form of a safe, indicated generally at 620, incorporating a verification device 622 in accordance with an exemplary embodiment of the present disclosure. Verification device 622 includes a fingerprint scanner 624 and an input keypad 626, both of which function similar to fingerprint scanners and input keypads described elsewhere herein. As with other embodiments, an alert code entered into input keypad 626 can send a signal, wirelessly or by wired connection, to authorities or a security service. It should be apparent that any system that includes a processor, as does system 620, includes an internal clock 628. In one embodiment, a limited functionality code input can delay opening of system 620 by a predetermined interval to provide time for a security or police response.

Figure 40:
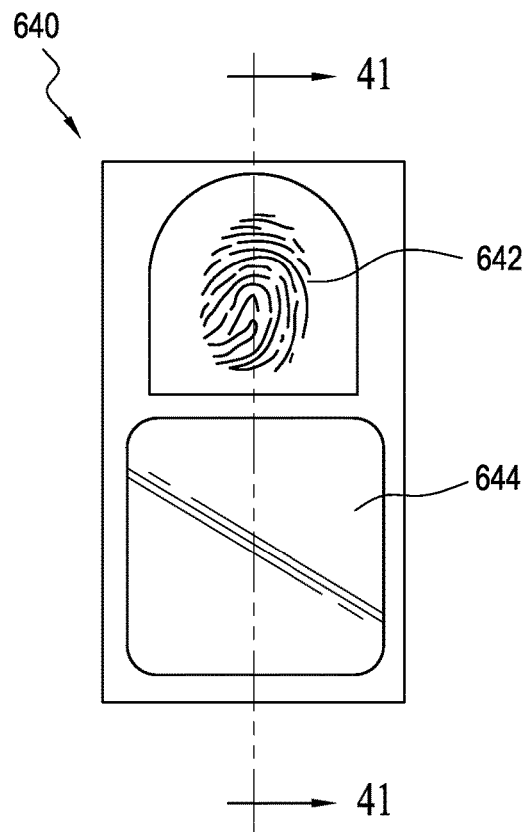
FIG. 40 shows a plan view of a verification device in accordance with an exemplary embodiment of the present disclosure.
Figure 41:
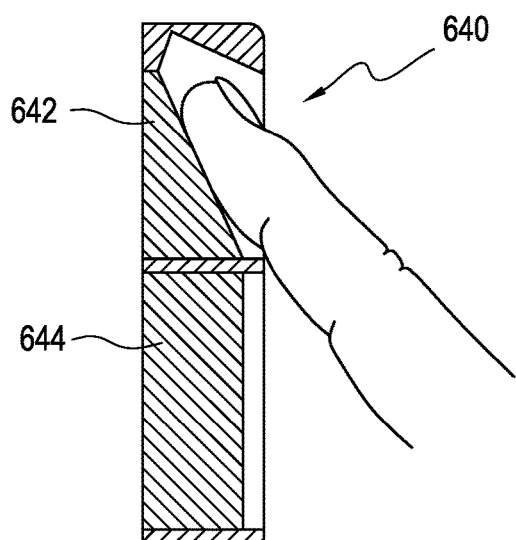
FIG. 41 shows a sectional view of the verification device of FIG. 40.
Figure 42:
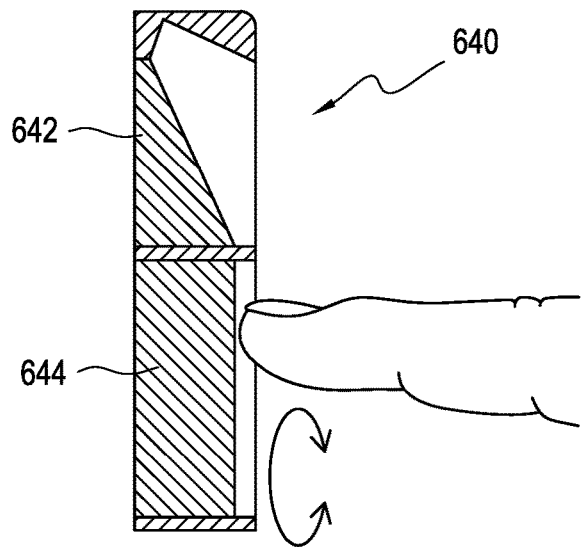
FIG. 42 shows a further sectional view of the verification device of FIG. 41.

FIGS. 40-42 show views of a verification device, indicated generally at 640, in accordance with an exemplary embodiment of the present disclosure. Verification device 640 includes a fingerprint scanner 642 or other biometric device, and a sensor 644 configured to identify gestures, such as a camera or touch sensitive array. Fingerprint scanner 642 can function as described elsewhere herein. Sensor 644 is configured to identify a gesture corresponding to a letter. In an exemplary embodiment, the letter could be C for safe (normal operation), letter D for limited functionality, and letter E for alert.

FIGS. 43-45 show views of a verification device, indicated generally at 650, in accordance with an exemplary embodiment of the present disclosure. Verification device 650 includes a palm print reader or scanner 652 and a sensor 654 configured to identify gestures and/or shapes. Sensor 654 can be, for example, a camera or other input device. To authenticate a user, the user first places a hand 656 over palm print reader or scanner 652. The grooves and lines on the palm of hand 656 provide unique biometric identification of the user. Once the user is identified, the user makes one or more gestures, such as forming a shape with hand 656 or positioning hand 656 in a predetermined arrangement or configuration. Verification device 650 thus uses the biometric identification of hand 656 in combination with a user-defined gesture, hand shape, or hand configuration to authenticate the user. In addition, the user can predefine gestures, hand shapes, or hand configurations to indicate regular operation, alert, or limited functionality. While palm print reader or scanner 652 and sensor 654 are shown as two separate elements, it should be understood that reading a palm print and reading a gesture, hand shape, or hand configuration can be performed by the same device, in which case only one sensing element can be used. Furthermore, it should be understood that while authentication is performed as sequential steps of identifying a palm print followed by a hand gesture, hand shape, or hand configuration, both functions can be performed simultaneously, with the palm print of one hand being scanned while a hand gesture, hand shape, or hand configuration of the other hand is input. It should also be understood that either the left hand or the right hand or both can be used for purposes of scanning a palm print and inputting a hand gesture, hand shape, or hand configuration.

Figure 47:
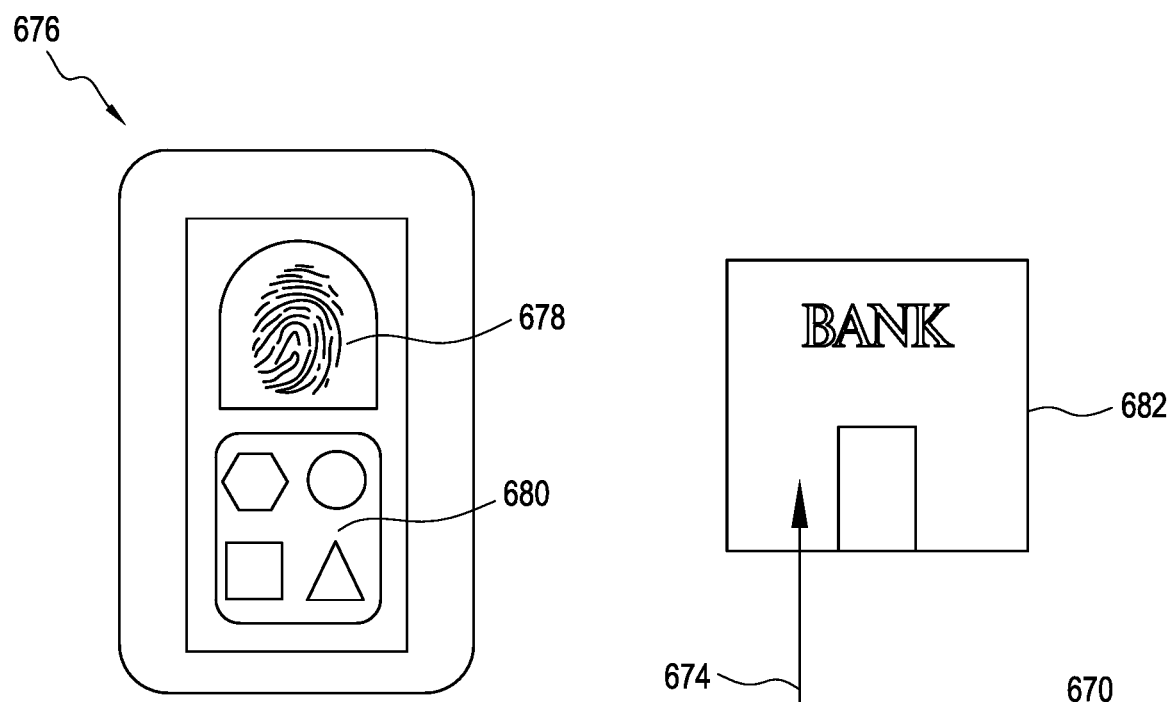
FIG. 47 shows a view of the verification device of FIG. 46.
Figure 46:
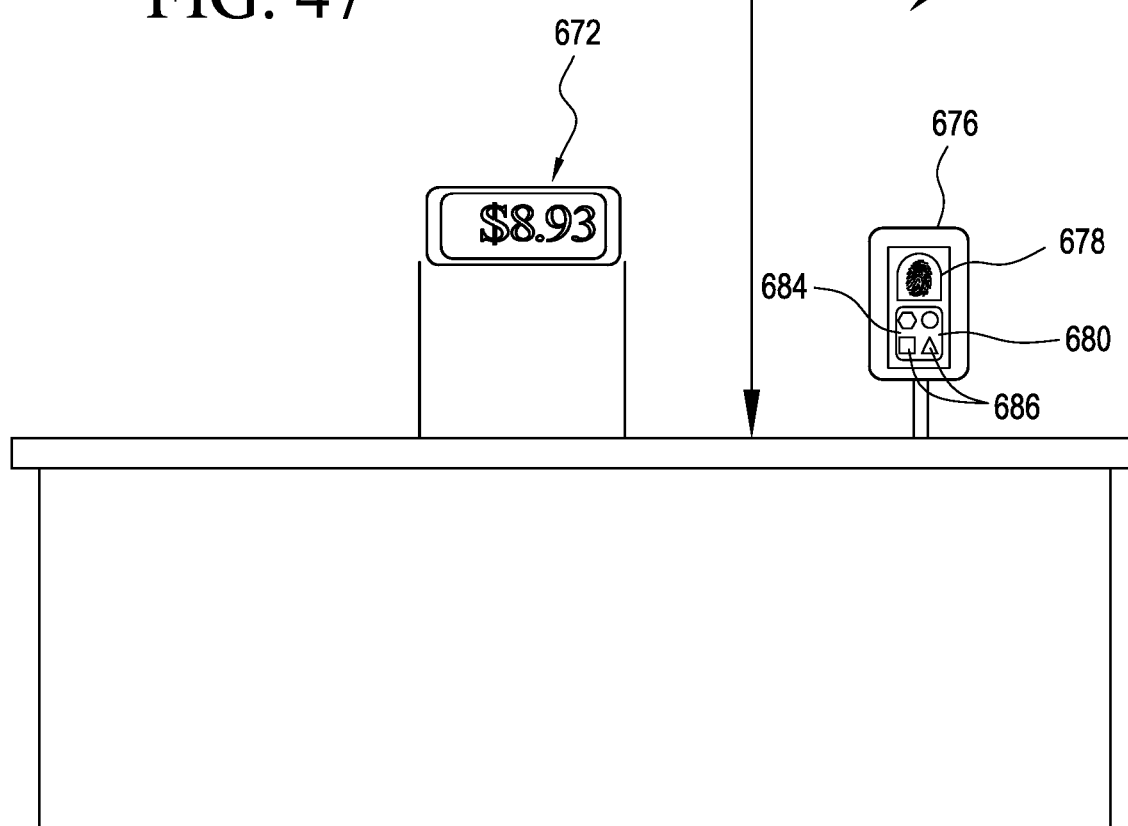
FIG. 46 shows a view of a further system incorporating a verification device in accordance with an exemplary embodiment of the present disclosure.
Figure 48:
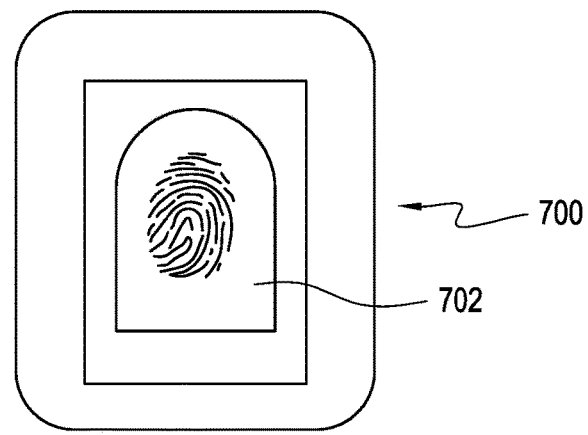
FIG. 48 shows a view of a verification device in accordance with an exemplary embodiment of the present disclosure.

FIGS. 46 and 47 show views of a further system, indicated generally at 670, incorporating a verification device in accordance with an exemplary embodiment of the present disclosure. System 670 is configured as a point-of-purchase system incorporating biometric authentication. Point-of-purchase system 670 includes a payment device or apparatus 672, such as a cash register or an automated self-checkout payment station that accepts cash and credit cards, and a communication network 674, which can be wireless or wired, that connects to a financial institution 682, which can be a virtual institution or a physical, brick-and-mortar installation. Point-of-purchase system 670 further includes a biometric verification device 676. Biometric verification device 676 includes a fingerprint scanner 678 and an input keypad 680. As with previously described embodiments, a user first places a finger on fingerprint scanner 678. Once biometric verification device 676 identifies the user, then input keypad 680 is activated. In an exemplary embodiment, input keypad 680 includes a touch sensitive surface 684 that also functions as a display. In the exemplary embodiment of FIG. 46, touch sensitive surface/display 684 is activated and four shapes 686 appear. The user touches one or more shapes in a sequence that corresponds, for example, to regular operation. If biometric authentication or verification device 676 is able to authenticate the user and operation is in normal, regular, or fully functional mode, point-of-sale system 670 communicates with financial institution 682 by way of communication network 674 to confirm funds are available for purchase.

Figure 49:
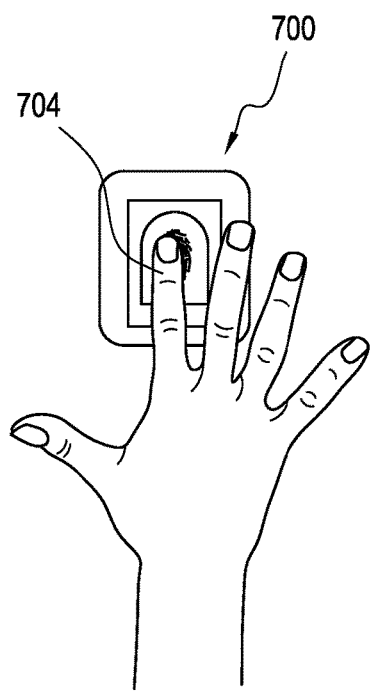
FIG. 49 shows a view of the verification device of FIG. 48.
Figure 50:
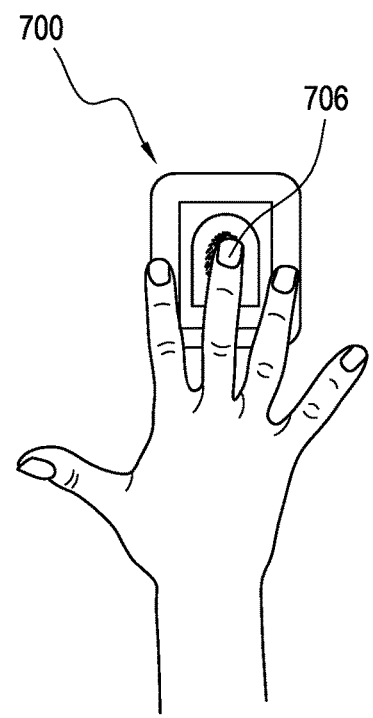
FIG. 50 shows a further view of the verification device of FIG. 48.
Figure 51:
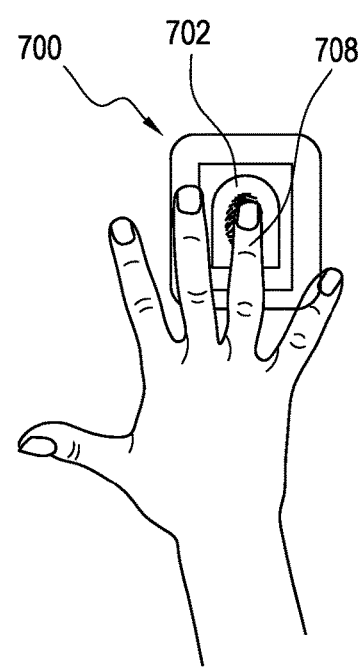
FIG. 51 shows a yet further view of the verification device of FIG. 48.

FIGS. 48-51 show views of a verification device, indicated generally at 700, in accordance with an exemplary embodiment of the present disclosure. Biometric verification device 700 includes a fingerprint scanner 702. In contrast to using a fingerprint followed by input via a keypad, as described in some embodiments described herein, the sequence of fingers or a specific finger scanned determines how biometric verification device 700 operates. For example, when an index finger 704 is scanned, as shown in FIG. 49, verification device 700 activates an alert mode, which can function in a manner similar to alert modes described elsewhere herein. In another example, when a middle finger 706 is scanned, as shown in FIG. 50, verification device 700 activates a regular, normal, or fully functional operation mode, which can operate in a manner similar to regular, normal, or fully functional operation modes described elsewhere herein. In yet another example, when a ring finger 708 is scanned, as shown in FIG. 51, verification device 700 activates a limited functionality mode, which can operate in a manner similar to limited functionality modes described elsewhere herein. It should be understood that any of the five fingers alone or in combination can be used, such as index finger 704 followed by ring finger 708 to indicate a certain operation, or middle finger 706 followed by index finger 704 to indicate another operation, and the like. It should also be understood that the combination of fingers can includes fingers from either or both hands.

Figure 52:
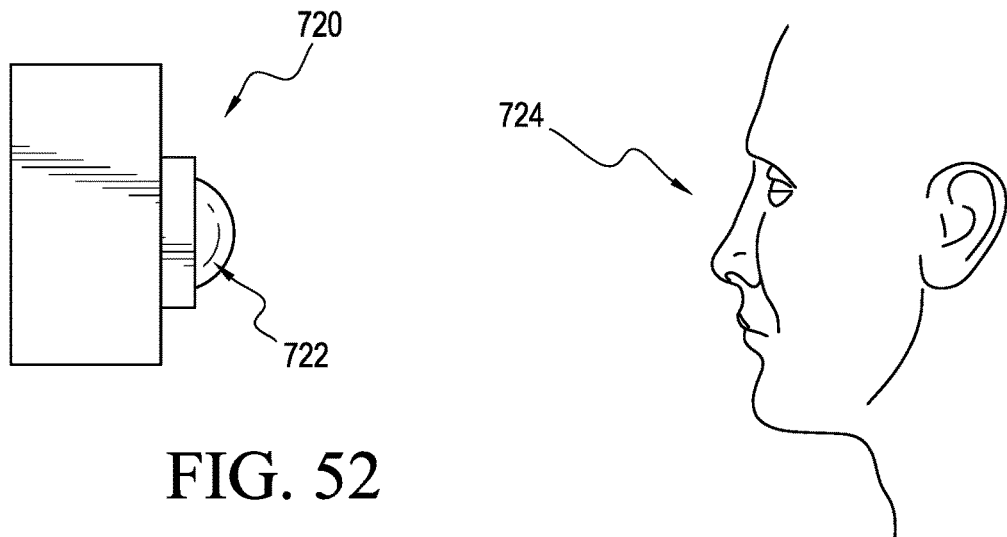
FIG. 52 shows a view of a verification device in accordance with an exemplary embodiment of the present disclosure.
Figure 53:
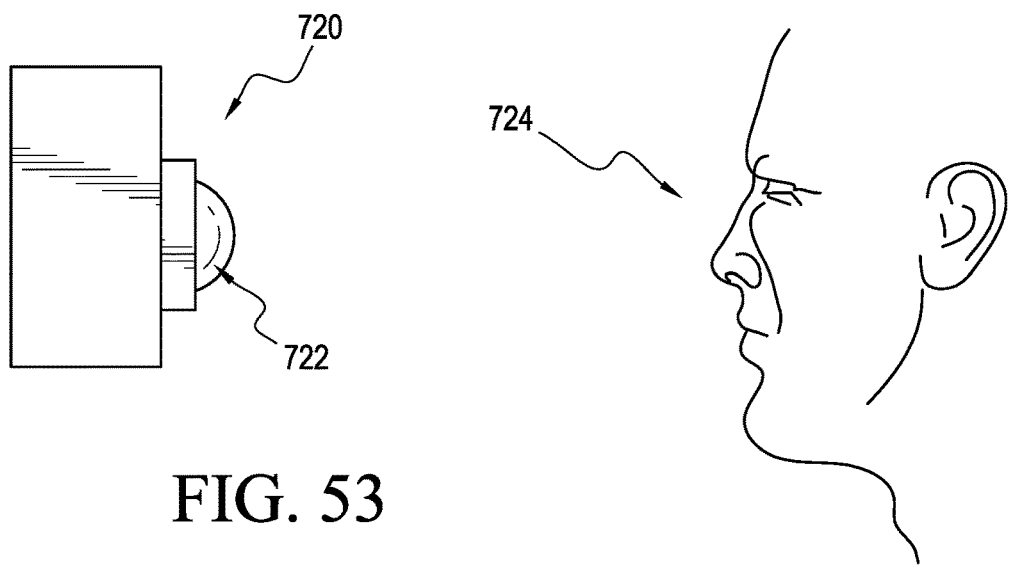
FIG. 53 shows a further view of the verification device of FIG. 52.
Figure 54:
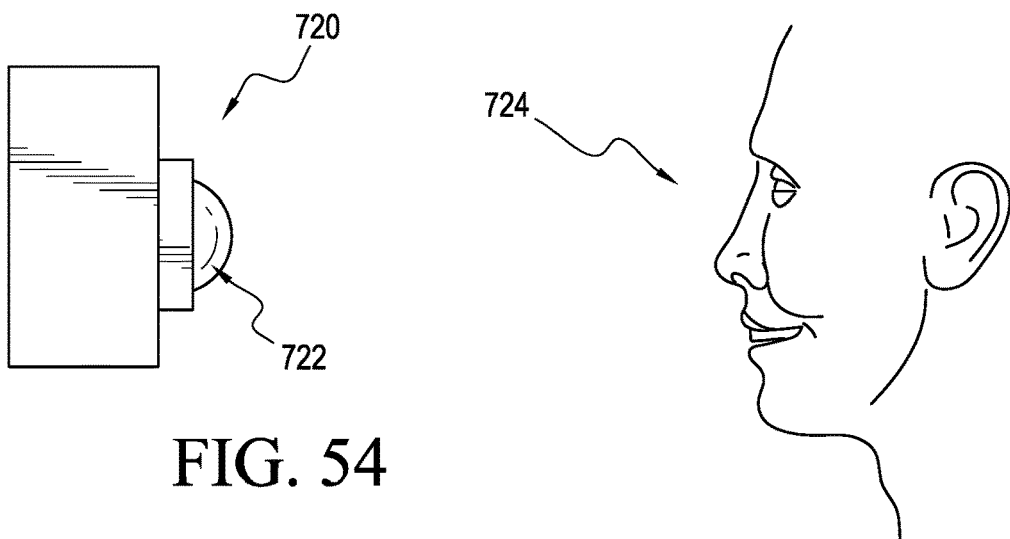
FIG. 54 shows a yet further view of the verification device of FIG. 52.
Figure 55:
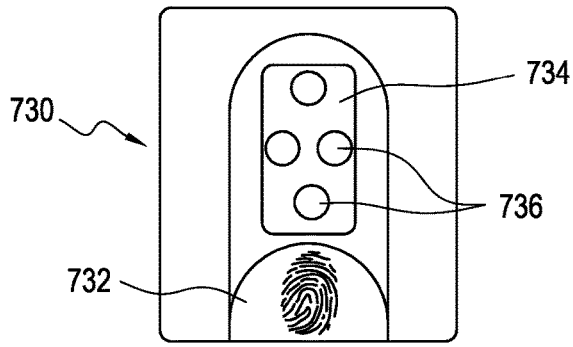
FIG. 55 shows a view of a verification device in accordance with an exemplary embodiment of the present disclosure.
Figure 56:
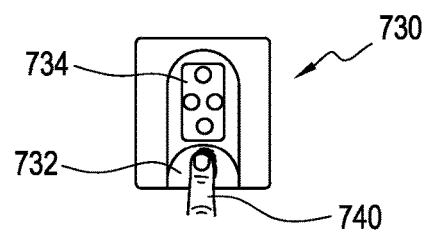
FIG. 56 shows a further view of the verification device of FIG. 55.
Figure 57:
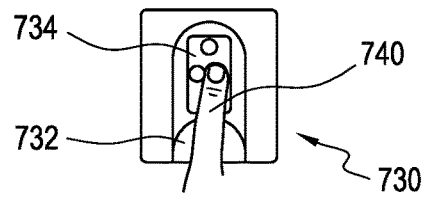
FIG. 57 shows a yet further view of the verification device of FIG. 55.
Figure 58:
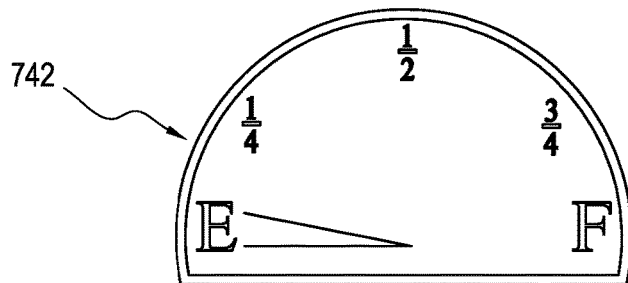
FIG. 58 shows a view of a fuel gauge in accordance with an exemplary embodiment of the present disclosure.
Figure 59:
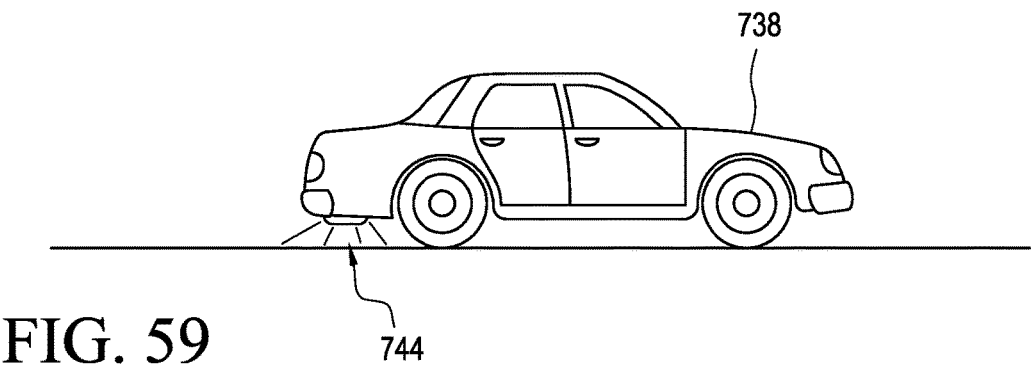
FIG. 59 shows a view of a vehicle in accordance with an exemplary embodiment of the present disclosure.
Figure 60:
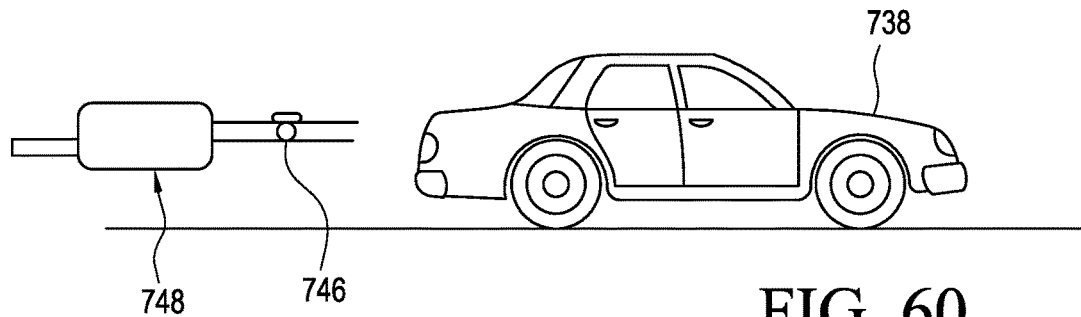
FIG. 60 shows a view of another vehicle in accordance with an exemplary embodiment of the present disclosure.

A human face can provide unique identification and be used as a biometric input for identification. FIGS. 52-54 show views of a facial identification and expression recognition device, indicated generally at 720, in accordance with an exemplary embodiment of the present disclosure that relies upon a combination of facial recognition and facial expressions. Biometric authentication device 720 includes a camera 722 or other similar device for acquiring images of a face 724. Facial expressions can include, for example, a grimace, as shown in FIG. 53, and a smile, as shown in FIG. 54, each of which correspond to a predetermined or predefined mode of operation. In an exemplary embodiment, a relaxed or no facial expression, such as that shown in FIG. 52, can indicate an alert mode, a duck or angry expression, such as that shown in FIG. 53, can indicate a normal, regular, or fully functional mode of operation, and a smiling face, such as that shown in FIG. 54, can indicate a limited functionality mode. Each of these modes can be as described elsewhere herein. To avoid an assailant recognizing the facial expression, biometric authentication device 720 can include an automated computer system that sends an email or text to the user at predetermined intervals, such as daily, weekly, monthly, etc., indicating the facial expressions associated with regular mode, alert mode, and limited functionality mode. An additional camera (not shown) and software can be incorporated in biometric authentication device 720 and adapted to identify other facial expressions, such as grimaces.

FIGS. 55-60 show views of a verification device, indicated generally at 730, and a system incorporating the verification device in accordance with an exemplary embodiment of the present disclosure. Verification device 730 includes a fingerprint scanner 732 and an input keypad 734. Input keypad 734 includes a plurality of pressure sensitive switches or buttons 736. Verification device 730 is positioned in a vehicle 738 and is configured to operate with one or more vehicle 738 systems. To operate vehicle 738, a user first places a finger 740 on fingerprint scanner 732. After verification device 730 identifies the user, the user actuates one or more pressure sensitive inputs 736 to complete the authentication process. If a code corresponding to limited functionality is input, a processor, such as processor 406 described elsewhere herein, can be configured to show a false reduced or no fuel level on a fuel gauge 742, such as that shown in FIG. 58. In addition, a fuel low warning light (not shown) can be actuated, potentially causing an unwanted passenger to abandon the vehicle. In addition, the processor can be programmed to shut off a fuel pump or stop flow through a fuel line after a predetermined interval. In an exemplary embodiment, a specialized light 744, which is positioned on vehicle 738 in a location that is not visible by the driver or a passenger, can be illuminated, indicating vehicle 738 is being robbed or a kidnapping is in progress. In another exemplary embodiment, combinable with one or more previously described embodiments, a reduced functionality code input into verification device 730 can cause a valve 746 installed in an exhaust system 748 to close, blocking the exhaust from exiting exhaust system 748, which eventually causes an engine of vehicle 738 to stall and cease operation. It should be apparent that valve 746 can be closed slowly such that performance of vehicle 738 becomes increasingly worse before stalling completely.

Figure 61:
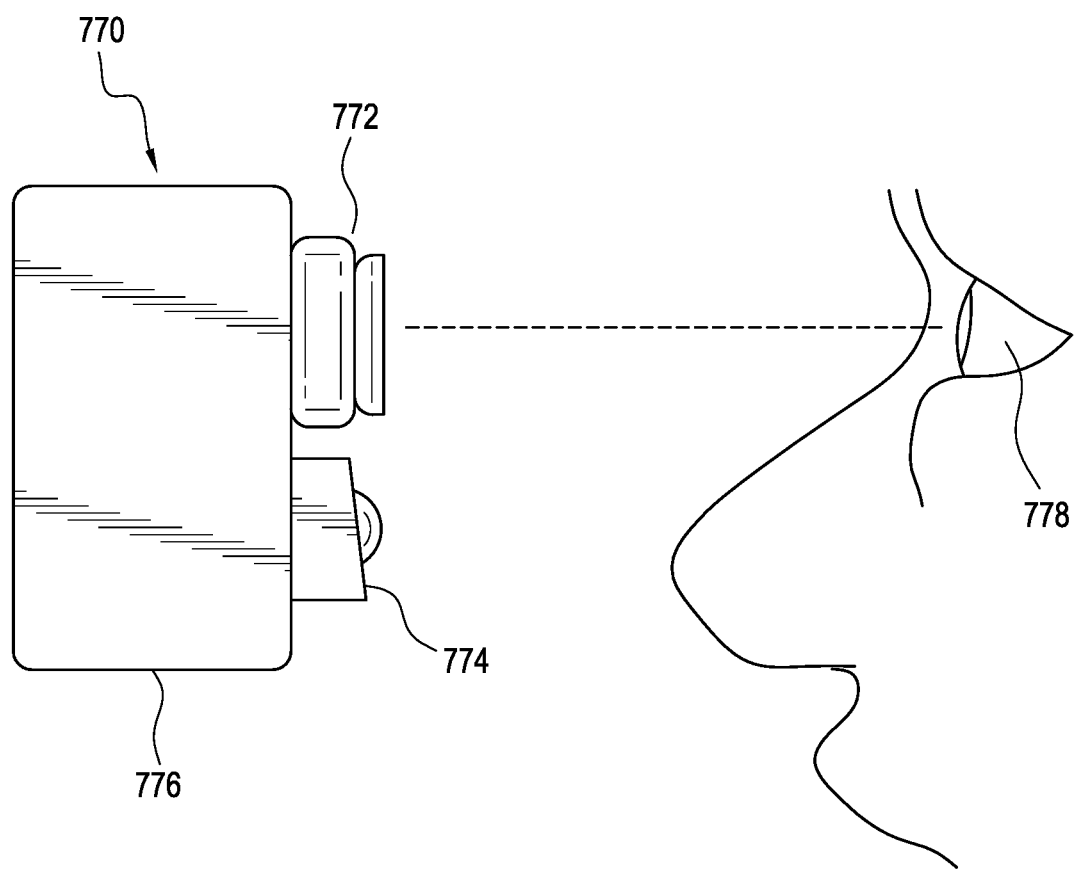
FIG. 61 shows a view of another verification device in accordance with an exemplary embodiment of the present disclosure.

FIG. 61 shows a view of a verification device, indicated generally at 770, in accordance with an exemplary embodiment of the present disclosure. Verification device 770 includes an iris, retina, or ocular scanner 772 and a camera 774, which can be a digital camera, positioned in a device body 776. Thus, verification device 770 can be described as an ocular verification device. Though camera 774 is shown, it should be understood from the description herein below that camera 774 could be replaced with an infrared scanner, a motion sensor, or other device configured to identify blinking. In addition, ocular verification device 770 can include features from other embodiments described herein, such as lights to indicate various operation modes. In a manner similar to fingerprint verification device embodiments, ocular verification device 770 includes ocular, iris, or retina scanner 772 to identify the user, i.e., body identification, and once the body is positively identified, which can be indicated by a light such as an LED, ocular verification device 770 activates camera 774 to monitor the eye for a predetermined period. During the predetermined period, the user blinks voluntarily, or preferably the user closes the eye completely voluntarily. For example, to initiate a normal, regular, or fully functional mode of operation the user can closes a single 778 three times in a row sequentially, i.e., non-stop. For an alert mode or a limited functionality mode, the user can close eye 778 four times, with each closure spaced 5 seconds apart. Ocular verification device 770 is configured to identify the blinking code(s) for a user and to provide instructions, from opening the safe to calling the police, as disclosed in other embodiments. In an alternative embodiment, a motion sensor coupled to a processor or controller and adapted to identify motion within predetermined period can be used in a similar manner. Likewise, an infrared imaging detector can be adapted to identify changes in temperature over time, and in this embodiment a baseline thermal image of the face, and in particular the eye is captured. The cornea of the eyeball has a distinct temperature, and with closure of the eye (i.e., blinking), the thermal image of the cornea disappears indicating closure of the eye or blinking. The infrared detector coupled to a processor or controller is adapted to identify changes to thermal image within certain period of time, and instructions provided in a similar manner, as for fingerprint verification device.

It should be understood that in appropriate embodiments presented hereinabove, a numerical touch screen or key pad can be combined with a biometric device. In this alternative embodiment, the fingerprint is scanned, which activates the numerical keypad, and three codes represent three modes. For example, pressing number I indicates normal, regular, or fully functional operation, pressing number 5 indicates an alert mode, and pressing number 8 indicates limited functionality, in accordance to the principles of the present disclosure. It should further be understood that while a single digit is used as an example, two or more digits can be used for each code.

It should also be understood that a numerical touch screen or key pad, without biometric device, can be used as an authorizing device, and in this alternative embodiment three codes represent three modes. For example, pressing 1 and 3 indicates normal, regular, or fully functional operation, pressing 5 alone indicates an alert mode, and pressing 7 and 8 indicates a limited functionality mode, in accordance to the principles of the present disclosure.

It should be further understood that a combination of an ID card and fingerprint scanning can be used, and the sequence of identification events activate a certain mode. By way of example, if the user places first his ID card in the reader and then the fingerprint is scanned, and then the card is scanned again indicates regular operation, but if the user places his finger first and then followed by the ID card indicates alert mode, and if the user scan the ID card twice activates limited functionality mode.

Though certain embodiments disclosed herein describe a pressure sensor, it should be apparent that other sensors could be used in place of a pressure sensor, though without the ability to measure pressure level. For example, motion sensors could indicate movement of a body part, or an optical sensor could detect light levels that occur by a body part blocking and unblocking an input. It should also be apparent that pressure sensors can include piezoelectric type sensors. Thus, any combination of sensors and biometric devices capable of measuring or receiving a human input are within the scope of the invention.

It should also be apparent that if verification and authentication are denied that an embodiment with a camera can be configured to acquire an image of the unauthorized user.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

What is claimed is:

1. A device, comprising:
a first exterior surface positioned on a first side of the device;
a second exterior surface positioned on a first side of the device;
a fixed third exterior surface positioned on the first side of the device, the third exterior surface offset from the first exterior surface and the second exterior surface in a direction perpendicular to the first exterior surface and the second exterior surface such that the third exterior surface is positioned further from a second, opposite side of the device than the first exterior surface and the second exterior surface;
a first fingerprint sensor positioned on the first exterior surface, wherein the first fingerprint sensor gathers first fingerprint data of a finger of a user that is placed on the first fingerprint sensor;
a second fingerprint sensor positioned on the second exterior surface, wherein the second fingerprint sensor obtains second fingerprint data from a second finger of the user that is placed on the second fingerprint sensor while the first fingerprint is in contact with the first fingerprint sensor;
at least one first sensor positioned on a fourth exterior curved surface that is between the first exterior surface and the third exterior surface in a side view of the first exterior surface, the second exterior surface, and the third exterior surface from a direction that is parallel to the first exterior surface, the second exterior surface, and the third exterior surface; and
at least one second sensor positioned on a fifth curved exterior surface between the second exterior surface and the first exterior surface, wherein the at least one first and second sensor detect pressure data indicating movement of the finger of the user;
at least one third and fourth sensor positioned on opposite curved sides of the second fingerprint sensor, wherein the third and fourth sensors detect pressure data indicating movement of the second finger of the user;
wherein the first and second fingerprint data gathered by the first and second fingerprint sensors are analyzed to identify the user and determine if the first and second fingerprint data of the user is recognized,
wherein after determining that the first and second fingerprint data is recognized, the first, second, third and fourth sensors obtain a sequence of pressure actuations from the pressure data comprising pressure actuations from more than one finger of the user and the sequence of pressure actuations from the pressure data is compared against an authorization sequence and an alert code, wherein the user is determined to be authorized for full access when the sequence of pressure actuations match the authorization code and the user is determined to be under active threat and only granted limited access when the sequence of pressure actuations matches the alert code.

2. The device of claim 1, wherein the third exterior surface extends directly between the first exterior surface and the exterior second surface when viewing the first exterior surface, the second exterior surface, and the third exterior surface from the perpendicular direction.

3. The device of claim 1, wherein the at least one second sensor is selected from the group consisting of a light sensor, an optical sensor, a button switch, a pressure sensor, a piezoelectric sensor, and a motion sensor.

4. The device of claim 1, wherein each of the first exterior surface and the second exterior surface is formed as part of a respective rigid shape that forms a shape configured to respectively receive each of two adjacent fingers from a hand.

5. The device of claim 1, wherein the first exterior surface, the second exterior surface, the third exterior surface, the first fingerprint sensor, the at least one first sensor, and the at least one second sensor are formed as part of a computing device.

6. The device of claim 1, wherein the first exterior surface is positioned at a bottom of a first depression that begins on a side of the device that extends in a direction perpendicular to the third exterior side and extends in a first direction and the second exterior surface is positioned at a bottom of a second depression that begins on the side of the device that extends in the direction perpendicular to the third exterior side and extends in a second direction, and the first direction and the second direction are different directions such that the second direction is at an angle to the first direction.

7. The device of claim 1, wherein the second exterior surface extends in a direction that is non-parallel to a direction the first exterior surface extends.

8. The device of claim 1, wherein the first exterior surface includes a width extending in a direction from the at least one first sensor to the at least one second sensor, and a length extending in a direction perpendicular to the width, and the length is greater than the width.

9. The device of claim 8, wherein the first exterior surface includes a first end and a second end in the length direction, and the at least one first sensor and the at least one second sensor are positioned closer to the second end than the first end.

10. The device of claim 9, wherein the second end includes a curvilinear interface with the third exterior surface.

11. The device of claim 1, wherein a third sensor is positioned between the second exterior surface and the third exterior surface and a fourth sensor is positioned between the second exterior surface and the third exterior surface.

12. The device of claim 1, wherein the first sensor and the second sensor are positioned on opposite sides of the first fingerprint sensor.

13. The device of claim 1, wherein the at least one first sensor protrudes outwardly from the fourth exterior surface toward the third exterior surface.

14. The device of claim 11, wherein each of the at least one first sensor, the at least one second sensor, the third sensor, and the fourth sensor-protrudes outwardly from the fourth exterior surface, the fifth exterior surface, a sixth exterior surface on which the third sensor is positioned, and a seventh exterior surface on which the fourth sensor is positioned.

15. The device of claim 1, wherein the device includes a side that extends perpendicular to the third exterior surface, and the first exterior surface extends in a direction that is at an acute angle with respect to the side.

16. The device of claim 15, wherein the first exterior surface extends from the side and the first exterior surface is surrounded by the third exterior surface on three sides.

* * * * *